United States Patent [19]
Kamijo

[11] Patent Number: 5,649,226
[45] Date of Patent: Jul. 15, 1997

[54] PROCESSOR HAVING MULTIPLE INSTRUCTION REGISTERS

[75] Inventor: Shunsuke Kamijo, Kawasaki, Japan

[73] Assignee: Fujitsu Limited, Kawasaki, Japan

[21] Appl. No.: 347,090

[22] Filed: Nov. 23, 1994

[30] Foreign Application Priority Data

Dec. 28, 1993 [JP] Japan .................. 5-352824

[51] Int. Cl.[6] .................................... G06F 9/38
[52] U.S. Cl. .................. 395/800; 395/376; 364/DIG. 1
[58] Field of Search .................. 395/800, 375; 364/DIG. 1

[56] References Cited

U.S. PATENT DOCUMENTS

| | | | |
|---|---|---|---|
| 3,764,988 | 10/1973 | Onishi | 340/172.5 |
| 4,075,688 | 2/1978 | Lynch | 395/800 |
| 4,439,827 | 3/1984 | Wilkes | 395/375 |
| 4,928,226 | 5/1990 | Kamada | 395/375 |
| 5,283,874 | 2/1994 | Hammond | 395/375 |
| 5,317,745 | 5/1994 | Chan | 395/700 |
| 5,357,617 | 10/1994 | Davis | 395/375 |
| 5,381,531 | 1/1995 | Hanawa | 395/375 |
| 5,559,975 | 9/1996 | Christie | 395/375 |
| 5,561,775 | 10/1996 | Kurosawa | 395/375 |
| 5,574,937 | 11/1996 | Narain | 395/800 |

FOREIGN PATENT DOCUMENTS

| | | |
|---|---|---|
| 0 269 980 | 6/1988 | European Pat. Off. . |
| 0 471 191 | 2/1992 | European Pat. Off. . |

*Primary Examiner*—Eric Coleman
*Attorney, Agent, or Firm*—Armstrong, Westerman, Hattori, McLeland & Naughton

[57] ABSTRACT

A program is stored alternately in the memories 1A and 1B one word at a time. One execution circuit 5 is induced to select and execute the outputs of instruction decoders 4A and 4B alternately. After the execution circuit 5 holds the output of the instruction decoder 4A (4B), the instruction decoder 4A (4B) is induced to decode the output of the instruction register 3A (3B), a program counter 2A (2B) is induced to update the output and a instruction register 3A (3B) is induced to hold the output of the memory 1A (1B).

9 Claims, 34 Drawing Sheets

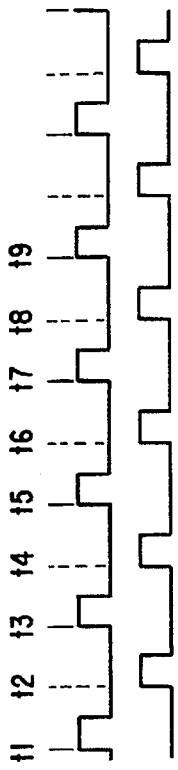
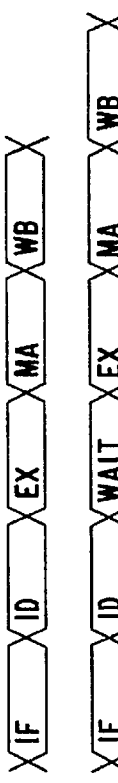
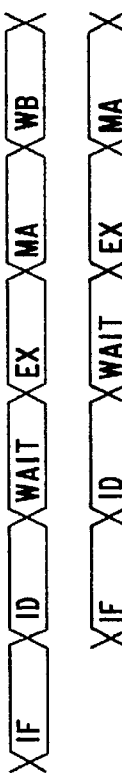
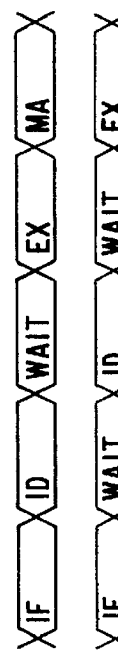
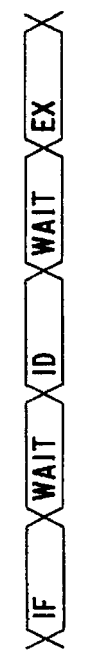
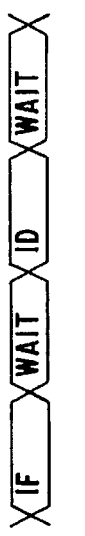
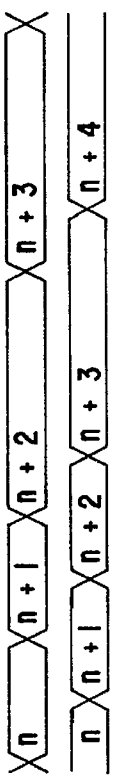
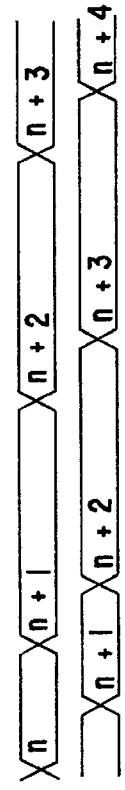

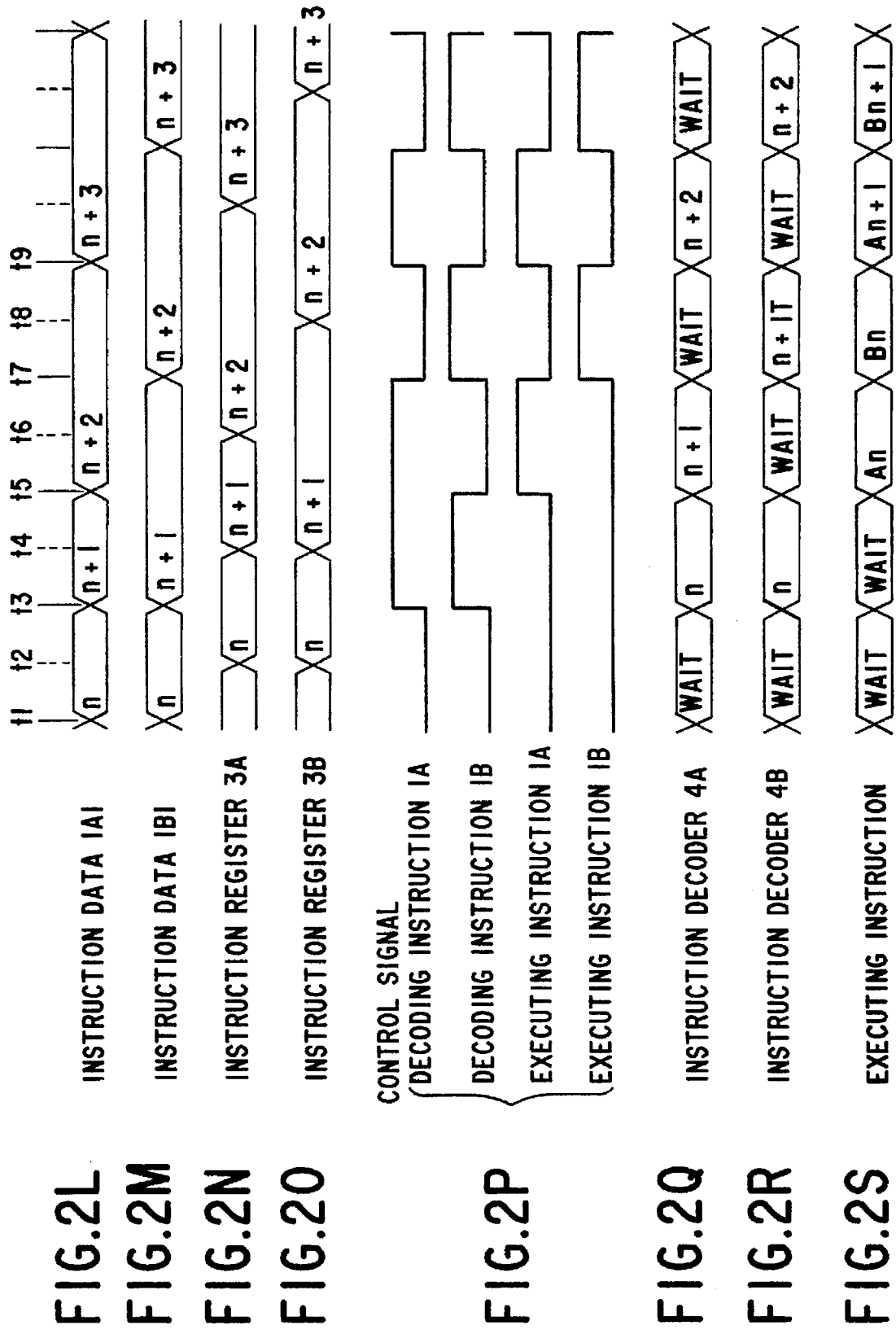

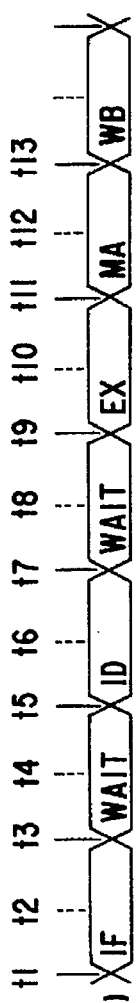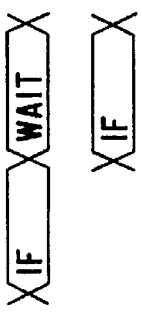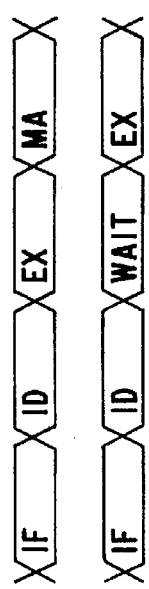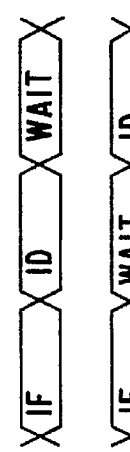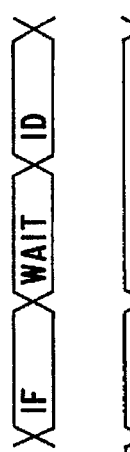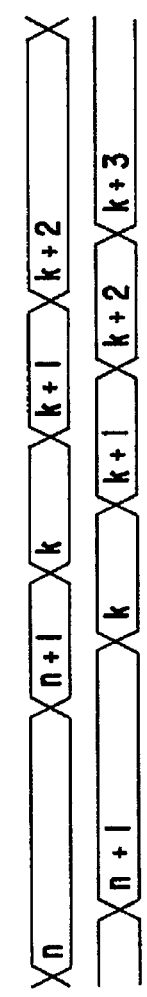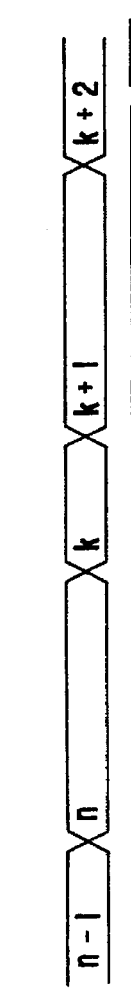

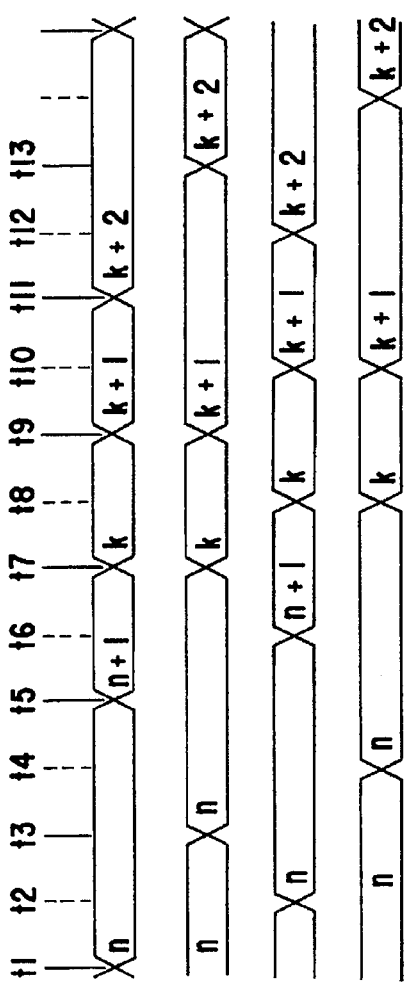
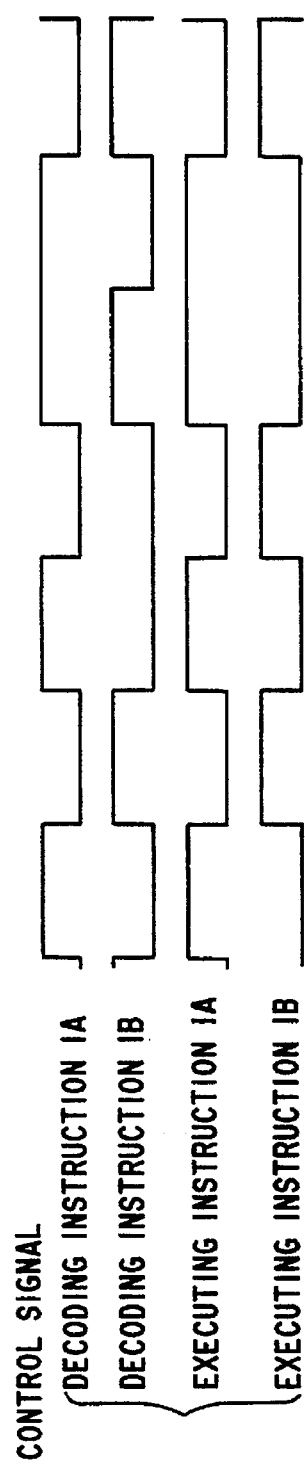
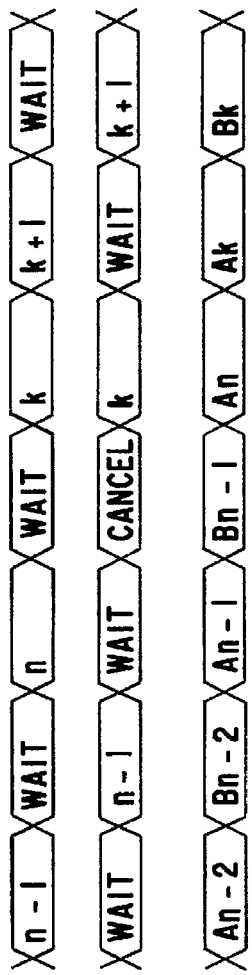
FIG.3J INSTRUCTION DATA IAI
FIG.3K INSTRUCTION DATA IBI
FIG.3L INSTRUCTION REGISTER 3A
FIG.3M INSTRUCTION REGISTER 3B
FIG.3N CONTROL SIGNAL { DECODING INSTRUCTION IA / DECODING INSTRUCTION IB / EXECUTING INSTRUCTION IA / EXECUTING INSTRUCTION IB
FIG.3O INSTRUCTION DECODER 4A
FIG.3P INSTRUCTION DECODER 4B
FIG.3Q EXECUTING INSTRUCTION

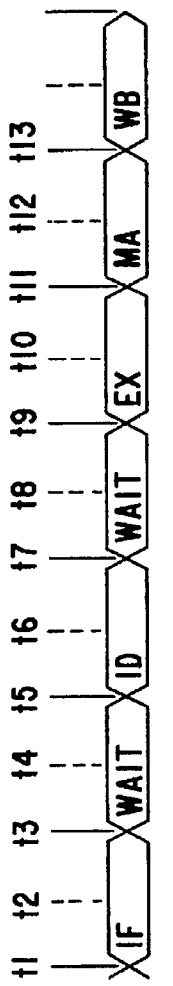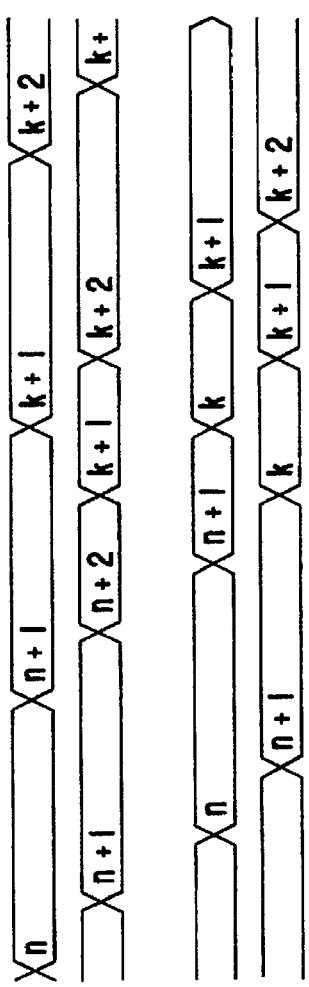

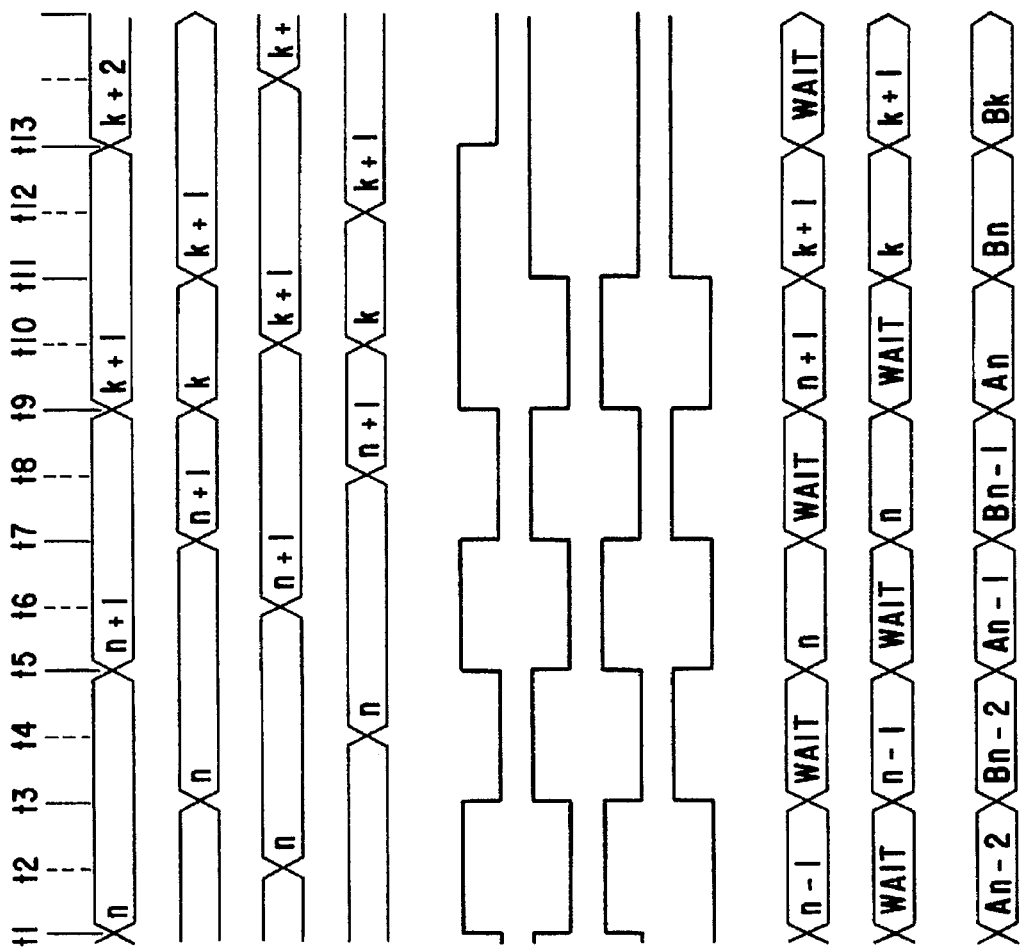

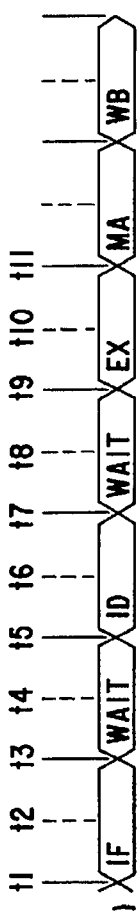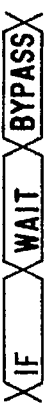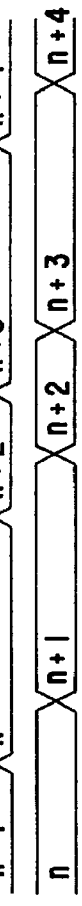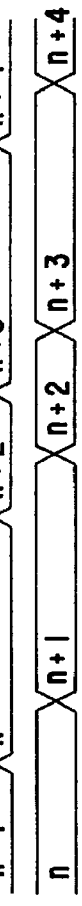

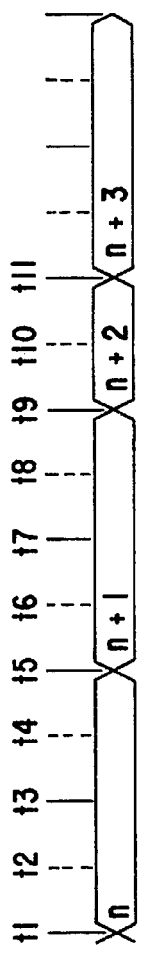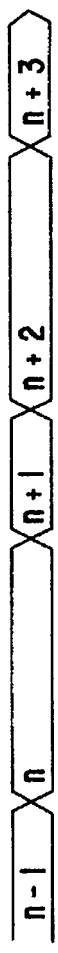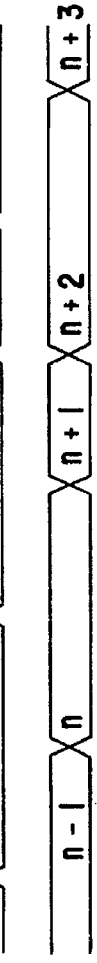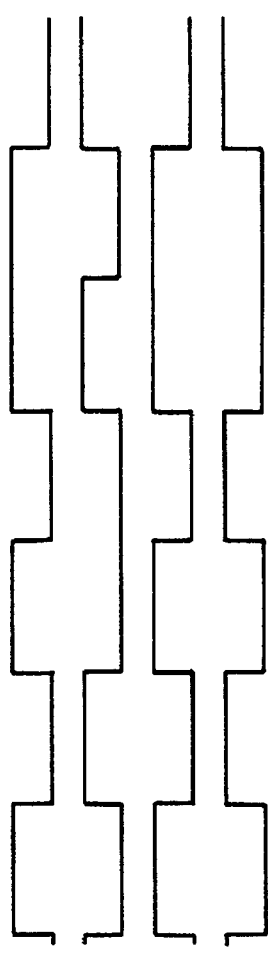

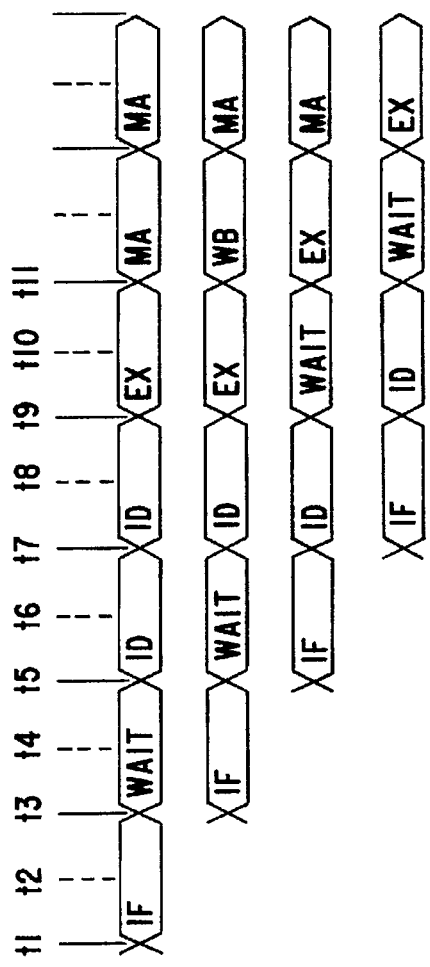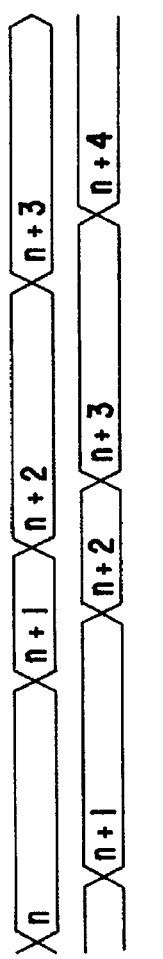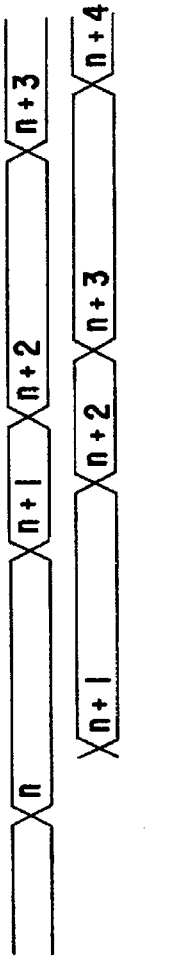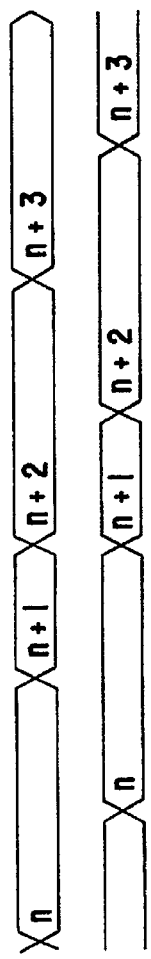

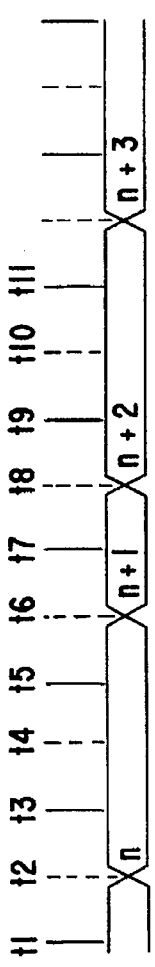
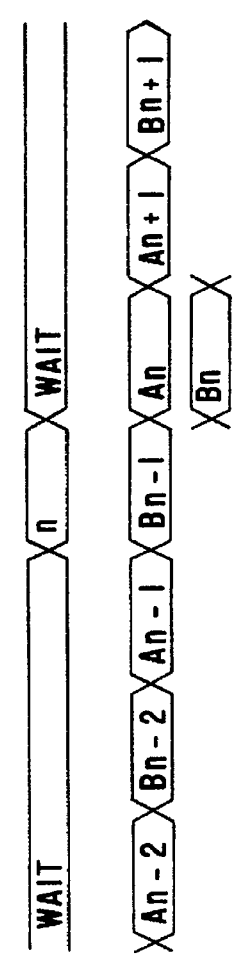
FIG.8I  INSTRUCTION REGISTER 3A
FIG.8J  INSTRUCTION REGISTER 3B
FIG.8K  CONTROL SIGNAL
{ DECODING INSTRUCTION IA
DECODING INSTRUCTION IB
DECODING DOUBLE LENGTH INSTRUCTION
EXECUTING INSTRUCTION IA
EXECUTING INSTRUCTION IB }
FIG.8L  INSTRUCTION DECODER 4A
FIG.8M  INSTRUCTION DECODER 4B
FIG.8N  DOUBLE LENGTH INSTRUCTION DECODER 4N
FIG.8O  EXECUTING INSTRUCTION

FIG.10

| IA1(0)   | IB1(0)   |
|----------|----------|
| IA1(1)   | IB1(1)   |
| IA1(2)   | IB1(2)   |
| ⋮        | ⋮        |
| IA1(M-1) | IB1(M-1) |
| IA1(M)   | IB1(M)   |

$i \rightarrow$ $\rightarrow IW(i) = \{IA1(i), IB1(i)\}$

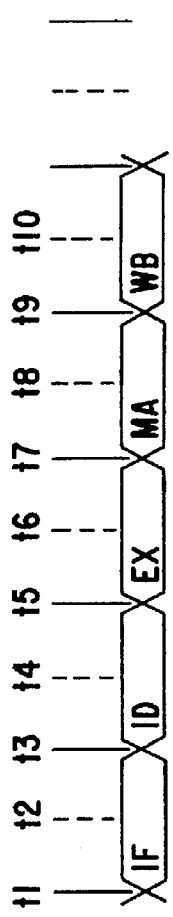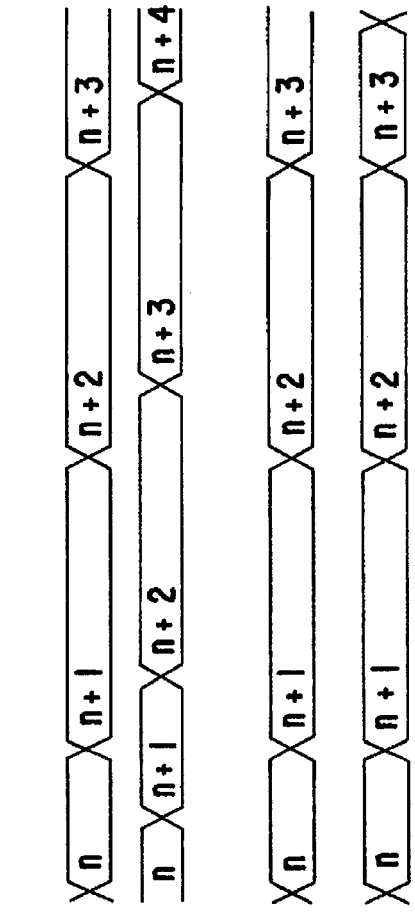

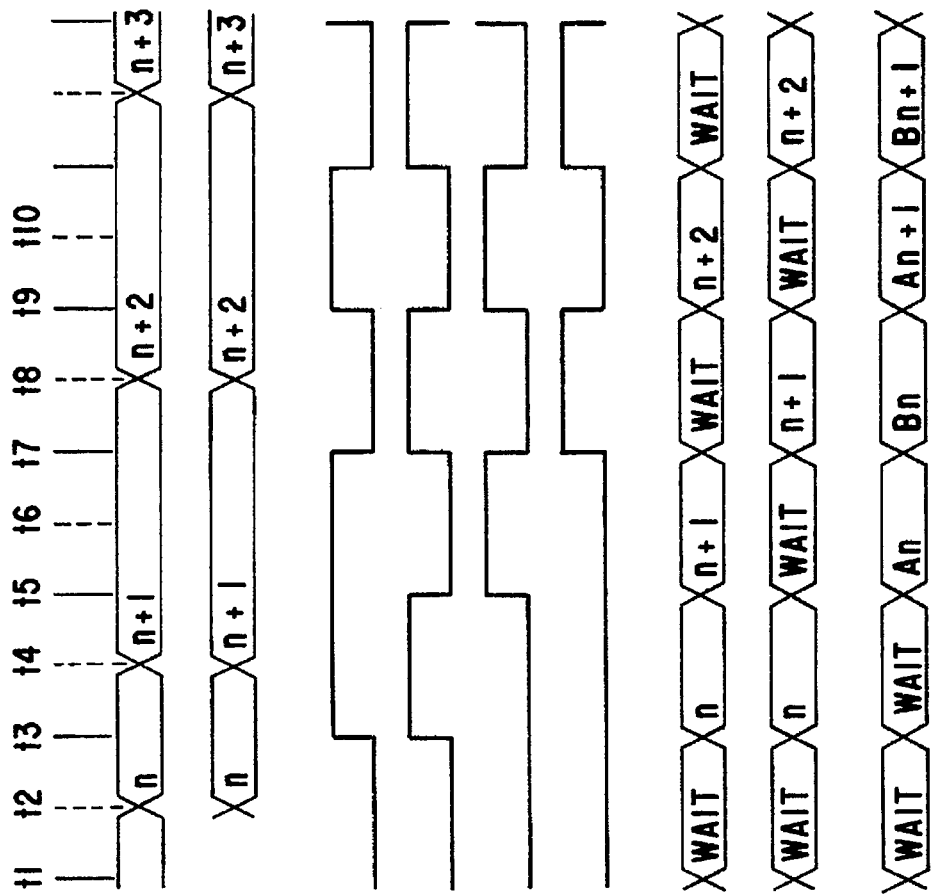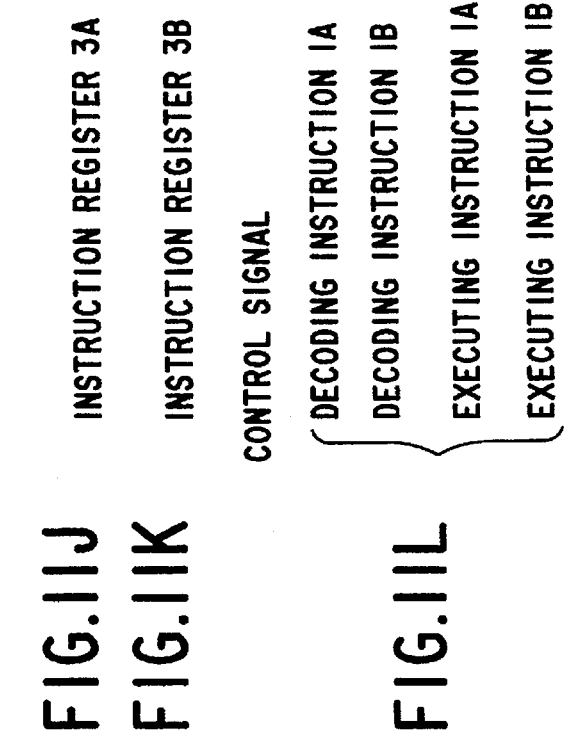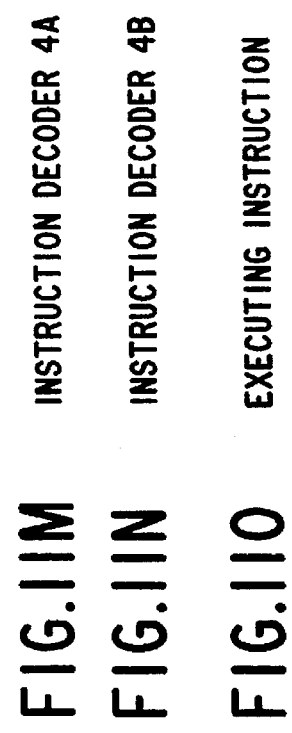

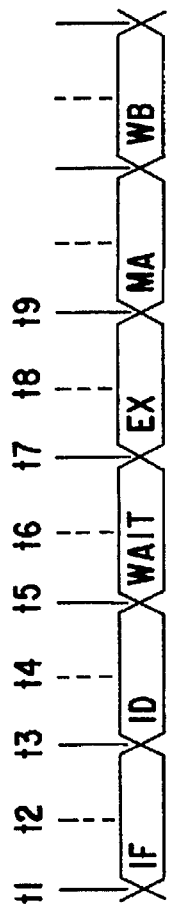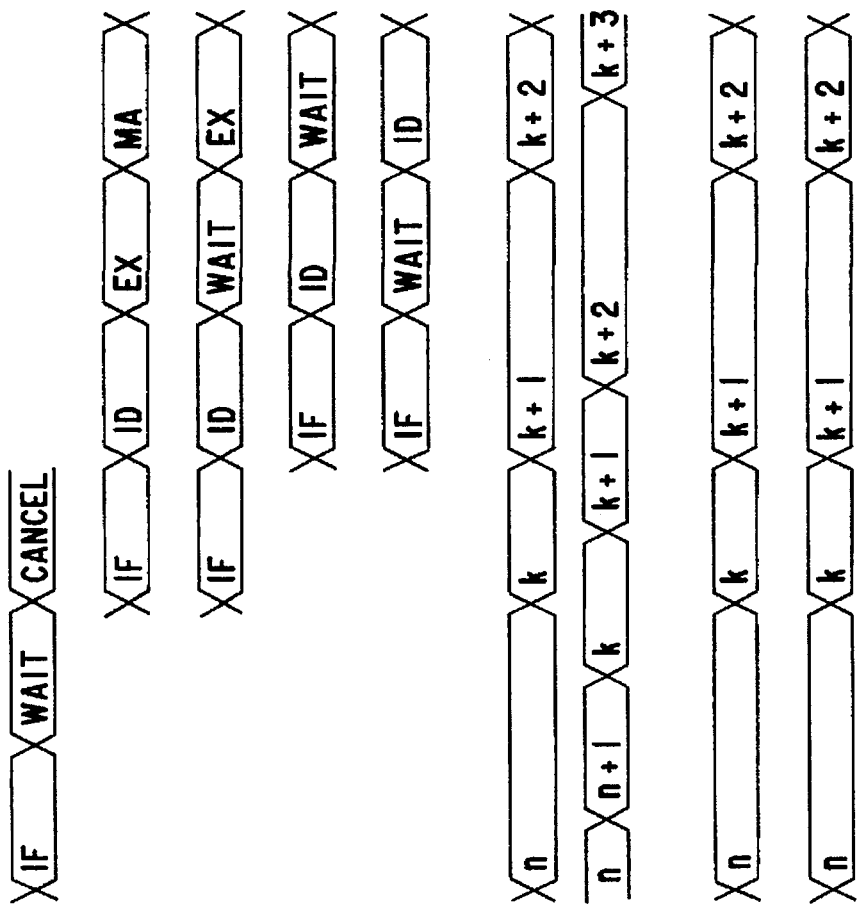

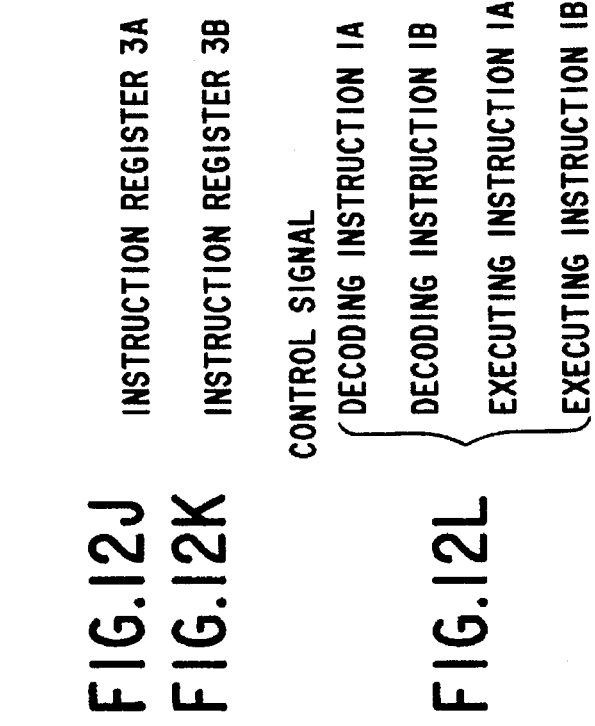

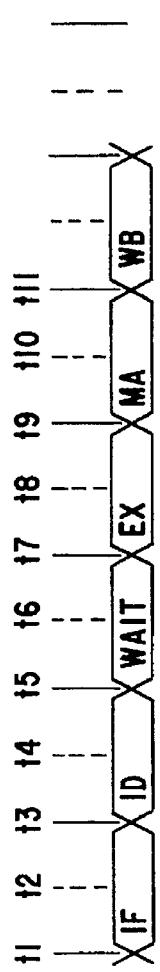
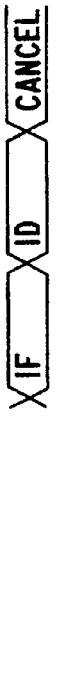
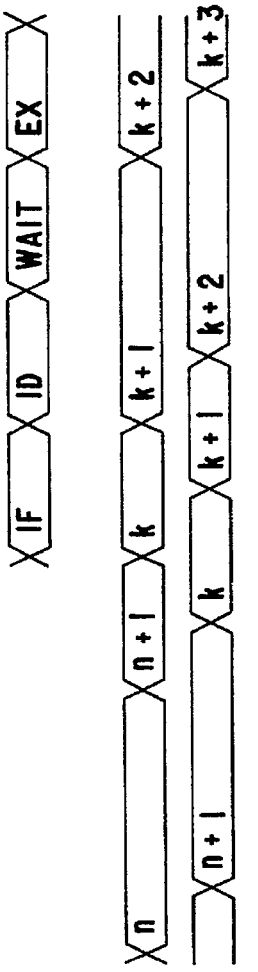
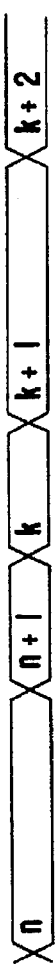
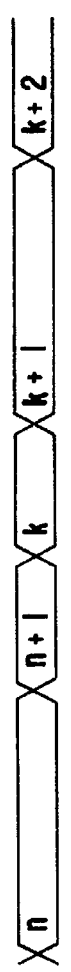
FIG.13A  An (COMPARE INSTRUCTION)
FIG.13B  Bn (CONDITIONAL BRANCH INSTRUCTION)
FIG.13C  An+1
FIG.13D  Bn+1
FIG.13E  Ak (INSTRUCTION AT BRANCH DESTINATION)
FIG.13F  Bk
PROGRAM COUNTER 2
FIG.13G  { INSTRUCTION ADDRESS PC / NEXT INSTRUCTION ADDRESS PCN
FIG.13H  INSTRUCTION DATA IAI
FIG.13I  INSTRUCTION DATA IBI

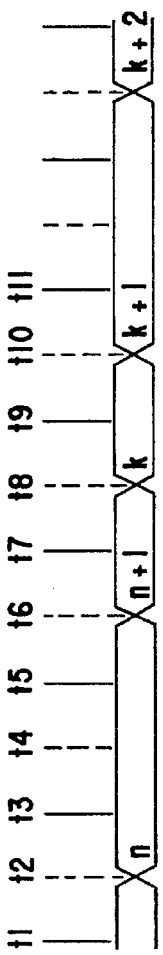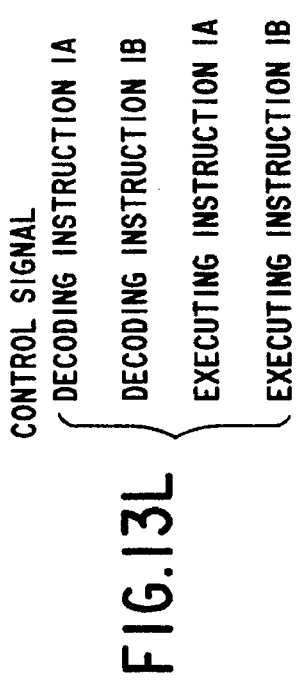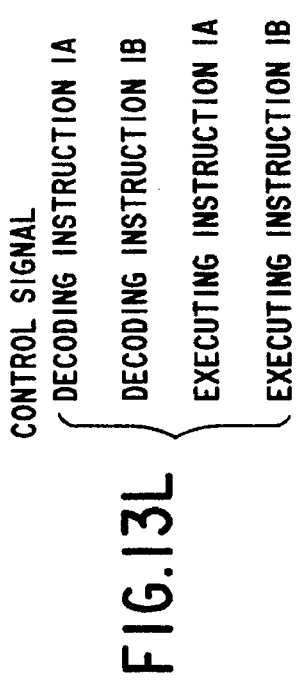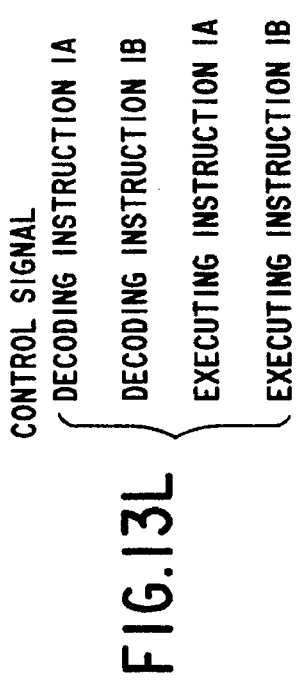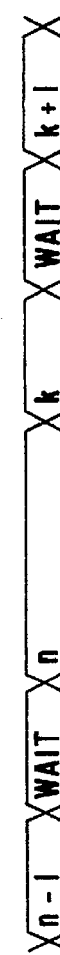
FIG.13J  INSTRUCTION REGISTER 3A
FIG.13K  INSTRUCTION REGISTER 3B
FIG.13L  CONTROL SIGNAL { DECODING INSTRUCTION IA / DECODING INSTRUCTION IB / EXECUTING INSTRUCTION IA / EXECUTING INSTRUCTION IB
FIG.13M  INSTRUCTION DECODER 4A
FIG.13N  INSTRUCTION DECODER 4B
FIG.13O  EXECUTING INSTRUCTION

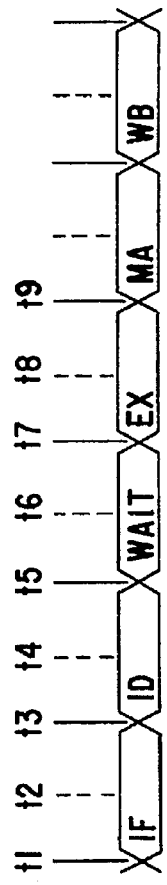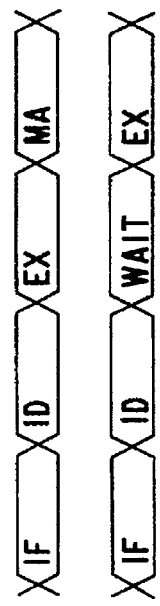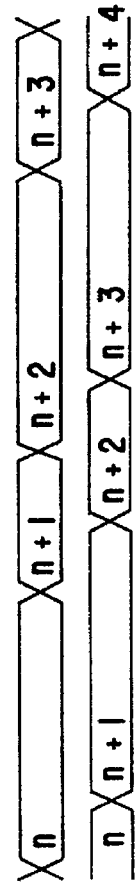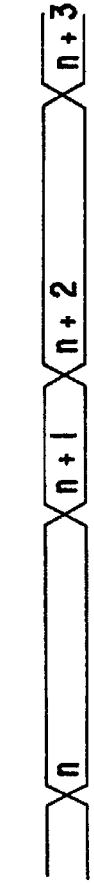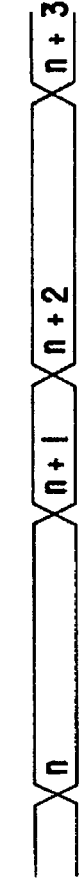
FIG.15A  An (IMMEDIATE DATA TRANSFER INSTRUCTION)
FIG.15B  Bn (IMMEDIATE DATA)
FIG.15C  An+1
FIG.15D  Bn+1
FIG.15E  PROGRAM COUNTER 2 { INSTRUCTION ADDRESS PC / NEXT INSTRUCTION ADDRESS PCN
FIG.15F  INSTRUCTION DATA IAI
FIG.15G  INSTRUCTION DATA IBI
FIG.15H  INSTRUCTION REGISTER 3A
FIG.15I  INSTRUCTION REGISTER 3B

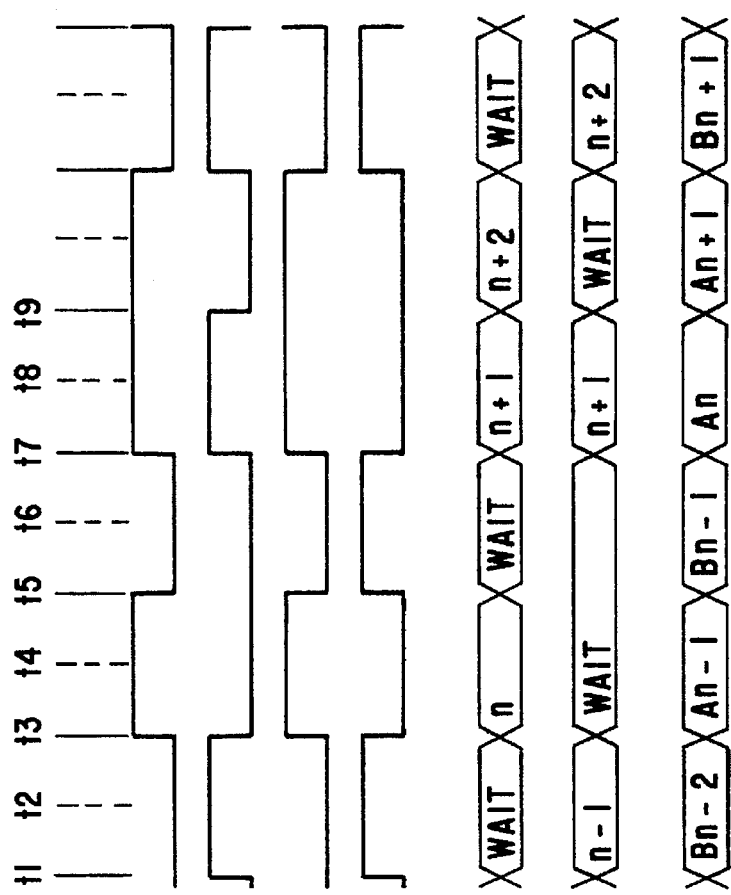

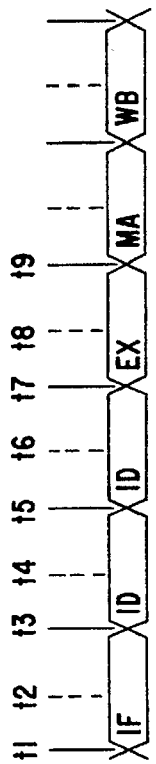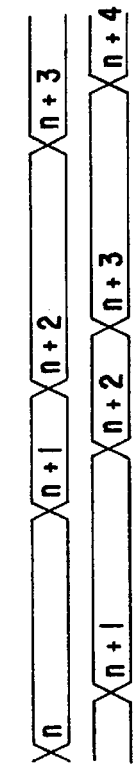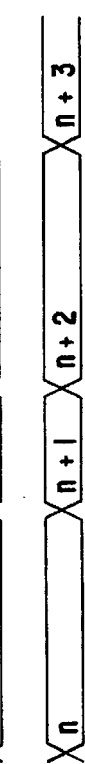

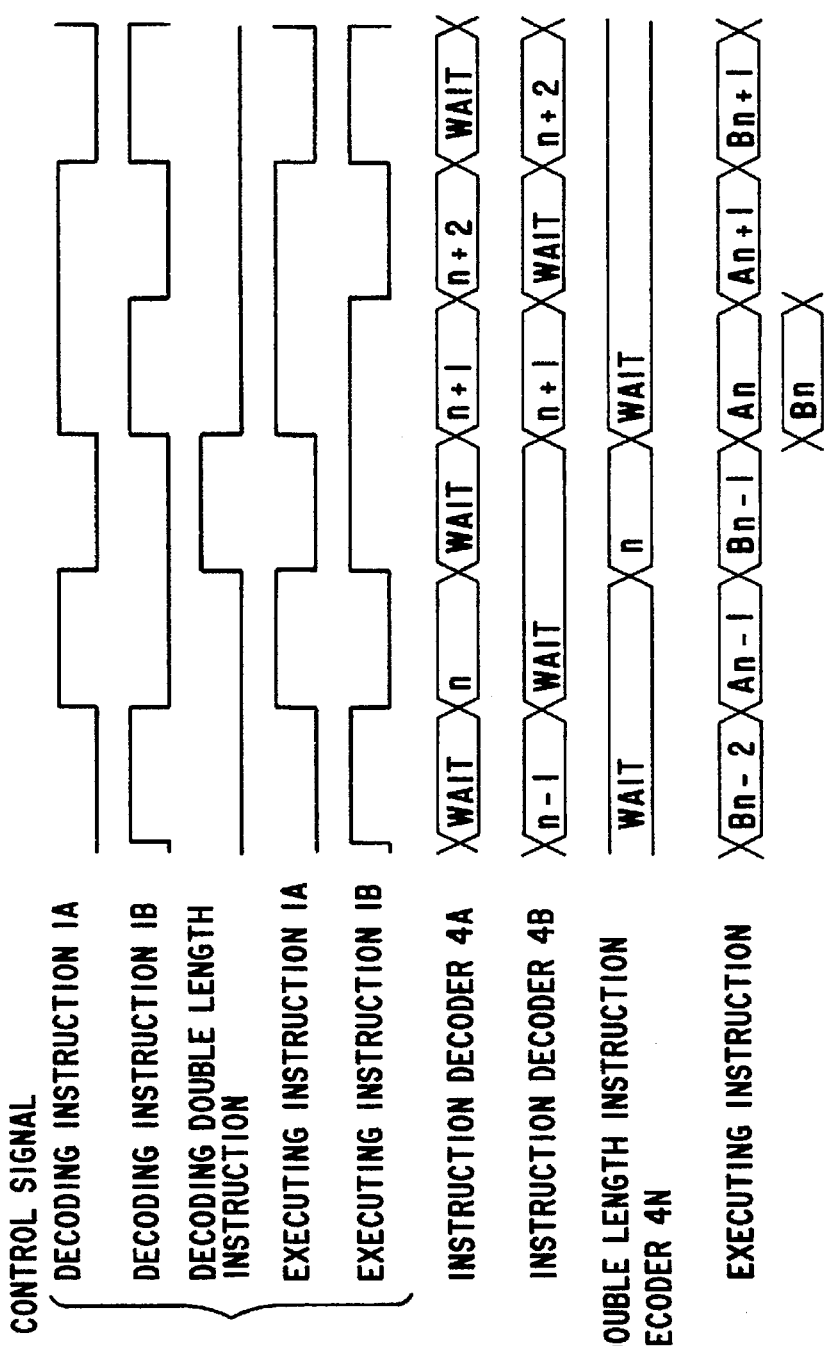

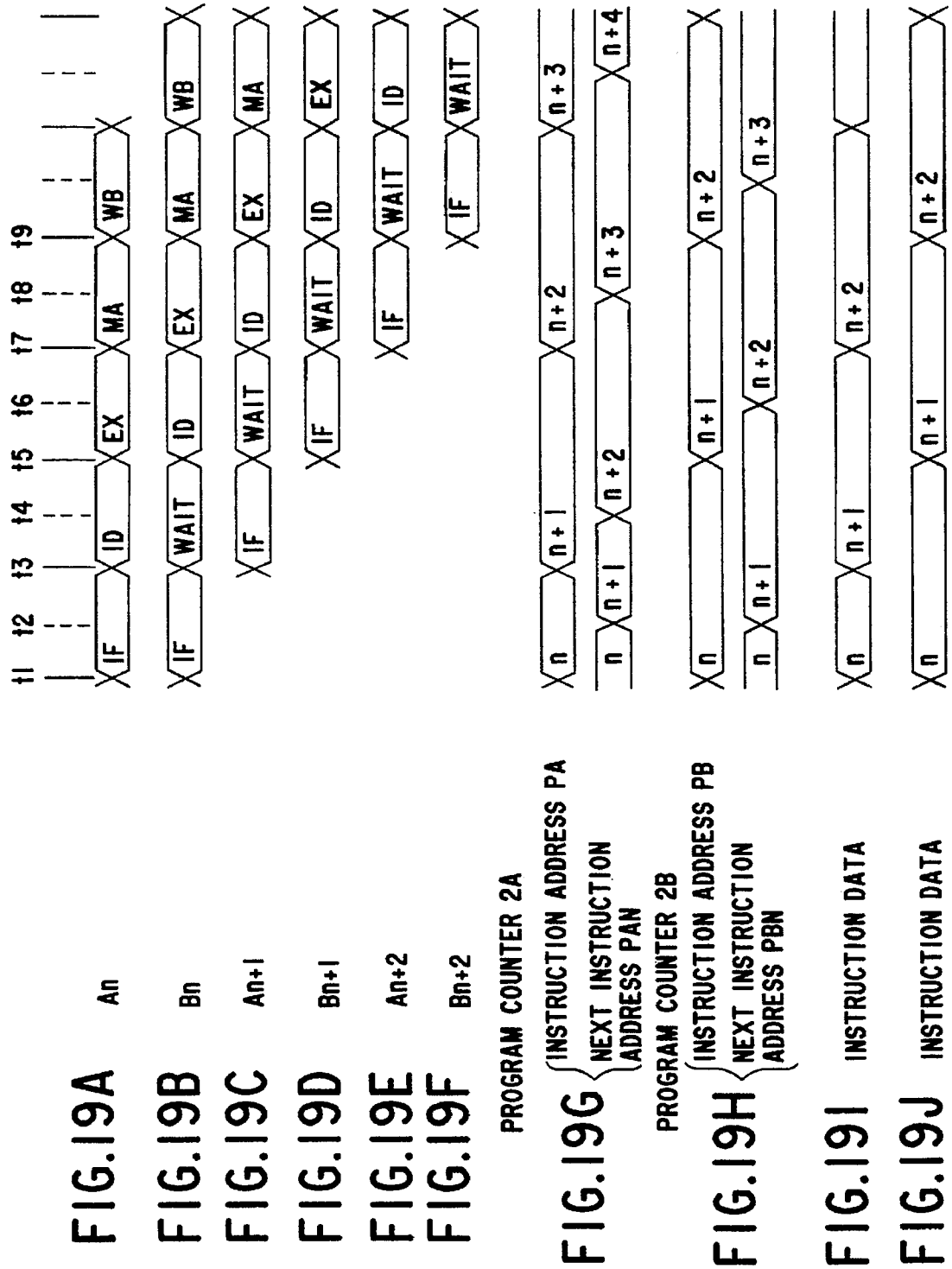

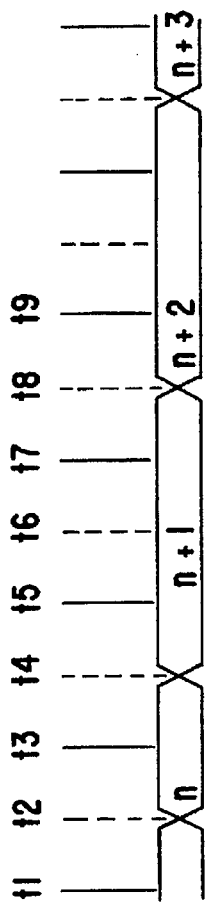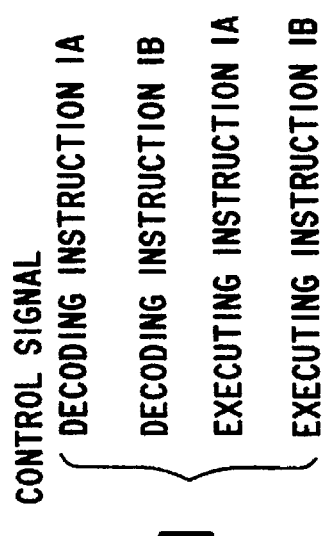
FIG.19K  INSTRUCTION REGISTER 3A
FIG.19L  INSTRUCTION REGISTER 3B
FIG.19M  CONTROL SIGNAL { DECODING INSTRUCTION IA / DECODING INSTRUCTION IB / EXECUTING INSTRUCTION IA / EXECUTING INSTRUCTION IB
FIG.19N  INSTRUCTION DECODER 4
FIG.19O  EXECUTING INSTRUCTION

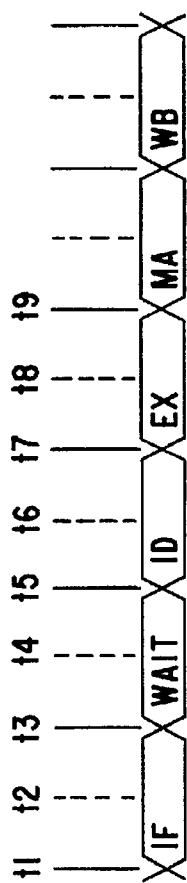
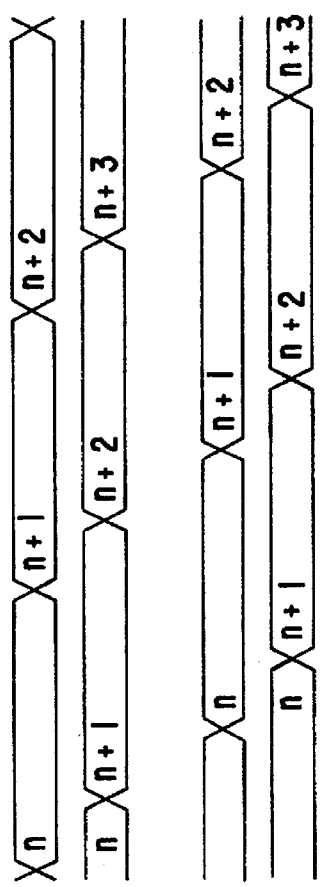
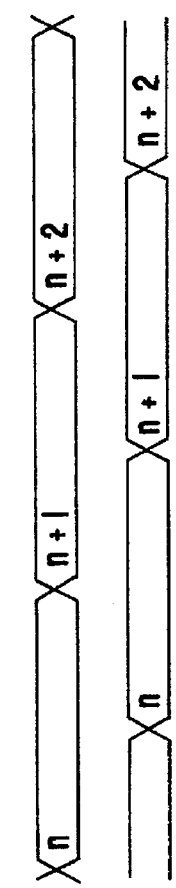

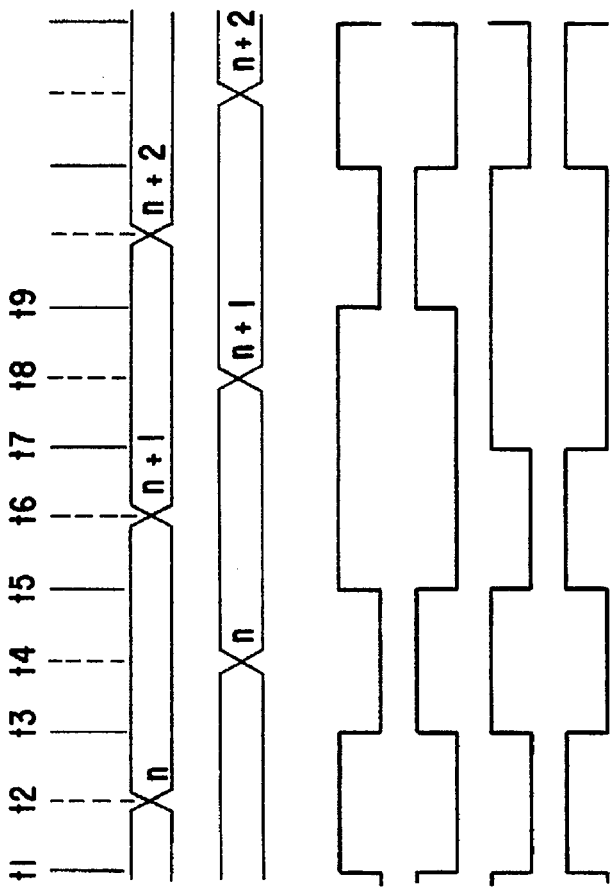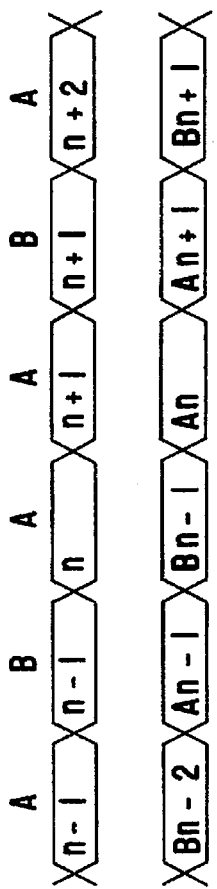

PROCESSOR HAVING MULTIPLE INSTRUCTION REGISTERS

BACKGROUND OF THE INVENTION

The present invention relates to a processor that may be a micro processing unit (MPU) with an internal or external program memory, a digital signal processor (DSP) with an internal or external program memory or the like.

These types of processors perform pipeline processing in order to speed up processing. In pipeline processing in the prior art, an instruction queue comprising, for example, 6 stages of registers is connected to the front stage of a decoder and a queue with the same number of stages is connected to the rear stage of this decoder. Since, when the pipeline has settled into the stationary state, one normal instruction can be executed in one cycle, high-speed processing is possible.

However, with instructions that require processing different from that in normal instructions, such as branch instructions, immediate data transfer instructions or variable length instructions, the processing speed is reduced as described below.

(1) in the case of a branch instruction, since it changes the execution sequence of the instructions, instructions that have been partially processed have been discarded and it is necessary to start anew from the instruction fetch, cancelling out the benefits of the pipeline processing.

Therefore, branch prediction may be performed for the branch instruction by connecting the instruction at the branch destination in front of the branch instruction and reading it into the pipeline. However, this induces the structure of the compiler, which performs the branch prediction, complicated. Also, under certain conditions the branching will not occur, and since the instruction at the branch destination will still be executed, though it is not necessary, the processing speed is reduced.

Another approach eliminates dead time by inserting the instruction to be executed before a conditional branch instruction in rear of the conditional branch instruction as a delay slot and by executing this delay slot while the branch destination is being determined. However, this method too, induces the compiler that inserts the delay slot more complicated and also, if a delay slot cannot be inserted, the processing speed is reduced.

(2) in the case of an immediate data transfer instruction, time is required for the calculation of execution address and for memory access. This problem can be overcome and processing can be speeded up by using an immediate data transfer instruction which places the data inside an instruction word. However, since an immediate data transfer instruction must wait for the intake of the immediate data, the execution needs a plurality of cycles, thus reducing the processing speed.

(3) in the case of multiple length instructions, it is necessary to perform decoding again after the multiple lengths are compounded, thus the execution needs a plurality of cycles, reducing the processing speed.

SUMMARY OF THE INVENTION

Accordingly, an object of the present invention is to provide a processor which can speed up the processing without complicating the compiler.

In accordance with the first aspect of the present invention, there is provided a processor comprising for each i that is 1 to n: an i-th program counter; i-th memory means for being addressed with an output from the i-th program counter; an i-th instruction register for holding an output from the i-th memory means; and an i-th instruction decoder for fetching and decoding an output from the i-th instruction register; the processor further comprising: an execution circuit for selecting one of the outputs from the 1-st to n-th instruction decoders and for executing processing based upon the selected output; and a control circuit for inducing the execution circuit to select and execute the outputs from the 1-st to n-th instruction decoders sequentially, for inducing the i-th instruction decoder to fetch the output from the i-th instruction register after the execution circuit selects the output of the i-th instruction decoder, for inducing the i-th program counter to update after the i-th instruction decoder fetches, and for inducing the i-th instruction register to hold the output from the i-th memory means after the update; wherein a program is stored in the 1-st to n-th memory means in units of one word in the order of the 1-st memory means to n-th memory means.

With the first aspect of the invention, since the branch instruction and the instruction at the branch destination are executed continuously without interruption and without the compiler performing any special processing for the branch instruction, it is possible to speed up the processing compared to the prior art without complicating the compiler.

In accordance with the second aspect of the present invention, there is provided a processor comprising: a program counter; memory means for storing n words of the program sequentially within one address and for being addressed with an output of the program counter to output the n words; 1-st to n-th instruction registers for holding the output from the memory means, one word each for a total of n words; 1-st to n-th instruction decoders for fetching and decoding the outputs from the 1-st to n-th instruction registers respectively; an execution circuit for selecting one of the outputs from the 1-st to n-th instruction decoders and for executing processing based upon the selected output; and a control circuit for inducing the execution circuit to select and execute the outputs from the 1-st to n-th instruction decoders sequentially, for inducing the i-th instruction decoder to fetch the output from the i-th instruction register after the execution circuit selects the output of the i-th instruction decoder, for inducing the program counter to update after the execution circuit selects all the outputs of the 1-st to n-th instruction decoders once, and for inducing the 1-st to n-th instruction registers to hold the output from the memory means after the update.

With the second aspect of the invention, since the branch instruction and the instruction at the branch destination are executed continuously without interruption and without the compiler performing any special processing for the branch instruction, it is possible to speed up the processing compared to the prior art without complicating the compiler. In accordance with the third aspect of the present invention, there is provided a processor comprising for each i that is 1 to n: an i-th program counter; i-th memory means for being addressed with the output from the i-th program counter; and an i-th instruction register for holding the outputs from the i-th memory means; the processor further comprising: an instruction decoder for selecting one of the outputs from the 1-st to n-th instruction registers and for decoding the selected output; an execution circuit for executing processing based upon the output from the instruction decoder; and a control circuit for inducing the instruction decoder to select the outputs from the 1-st to n-th instruction registers sequentially, for inducing the i-th program counter to update after the output of the i-th instruction register is selected by the instruction decoder, and for inducing the i-th instruction register to hold the outputs of the i-th memory means after the update; wherein a program is stored in the 1-st to n-th memory means in units of one word in the order of the 1-st memory means to the n-th.

With the third aspect of the invention, since the branch instruction and the instruction at the destination of branch are executed continuously without interruption and without the compiler performing any special processing for the branch instruction, it is possible to speed up the processing compared to the prior art without complicating the compiler.

In accordance with the first mode of anyone of the first to third aspect of the present invention, there is provided a processor wherein the outputs of the 1-st to n-th instruction registers are supplied to the input terminals of the execution circuit via bypasses; and the control circuit decides whether or not the instruction is an immediate data transfer instruction based upon the output of the decoder and, if it is determined to be the immediate data transfer instruction, induces the execution circuit to fetch an immediate data through the bypass in order to execute the immediate data transfer instruction at once.

With the first mode, an immediate data transfer instruction is executed in one cycle without interruption, achieving faster processing in comparison with the prior art, which requires a plurality of cycles.

In accordance with the second mode of anyone of the first to third aspect of the present invention, there is provided a processor further comprising: an N multiple length instruction decoder, where 2≦N≦n, for decoding successive N words in the outputs of the 1-st to n-th instruction registers and for supplying the decoding result to the execution circuit; wherein the control circuit, when the output of the instruction decoder which is single length indicates an N multiple length instruction, induces the N multiple length instruction decoder to decode the N multiple length instruction, and induces the single-length instruction decoder to decode a following instruction after the N multiple length instruction.

With the second mode, an N multiple length instruction is executed in one cycle without interruption, achieving faster processing in comparison with the prior art which requires a plurality of cycles.

BRIEF DESCRIPTION OF THE DRAWINGS

FIG. 2 is a timing chart that shows normal pipeline processing performed after a reset and up to the time when stationary state is achieved in the device in FIG. 1;

FIG. 3 is a timing chart that shows pipeline processing performed for an unconditional branch instruction in the device in FIG. 1;

FIG. 4 is a timing chart that shows pipeline processing performed for a conditional branch instruction in the device in FIG. 1;

FIG. 6 is a timing chart that shows pipeline processing performed for an immediate data transfer instruction in the device in FIG. 5;

FIG. 8 is a timing chart that shows pipeline processing performed for a double length instruction in the device in FIG. 7;

FIG. 10 shows the arrangement of a program within the memory in FIG. 9;

FIG. 11 is a timing chart that shows normal pipeline processing performed after a reset and up to stationary state in the device in FIG. 9;

FIG. 12 is a timing chart that shows pipeline processing performed for an unconditional branch instruction in the device in FIG. 9;

FIG. 13 is a timing chart that shows pipeline processing performed for a conditional branch instruction in the device in FIG. 9;

FIG. 15 is a timing chart that shows pipeline processing performed for an immediate data transfer instruction in the device in FIG. 14;

FIG. 17 is a timing chart that shows pipeline processing performed for a double length instruction in the device in FIG. 16;

FIG. 19 is a timing chart that shows normal pipeline processing performed after a reset up to the time when the stationary state is achieved in the device in FIG. 18;

FIG. 21 is a timing chart that shows pipeline processing performed for an immediate data transfer instruction in the device in FIG. 20.

DESCRIPTION OF THE PREFERRED EMBODIMENTS

Figure 1:
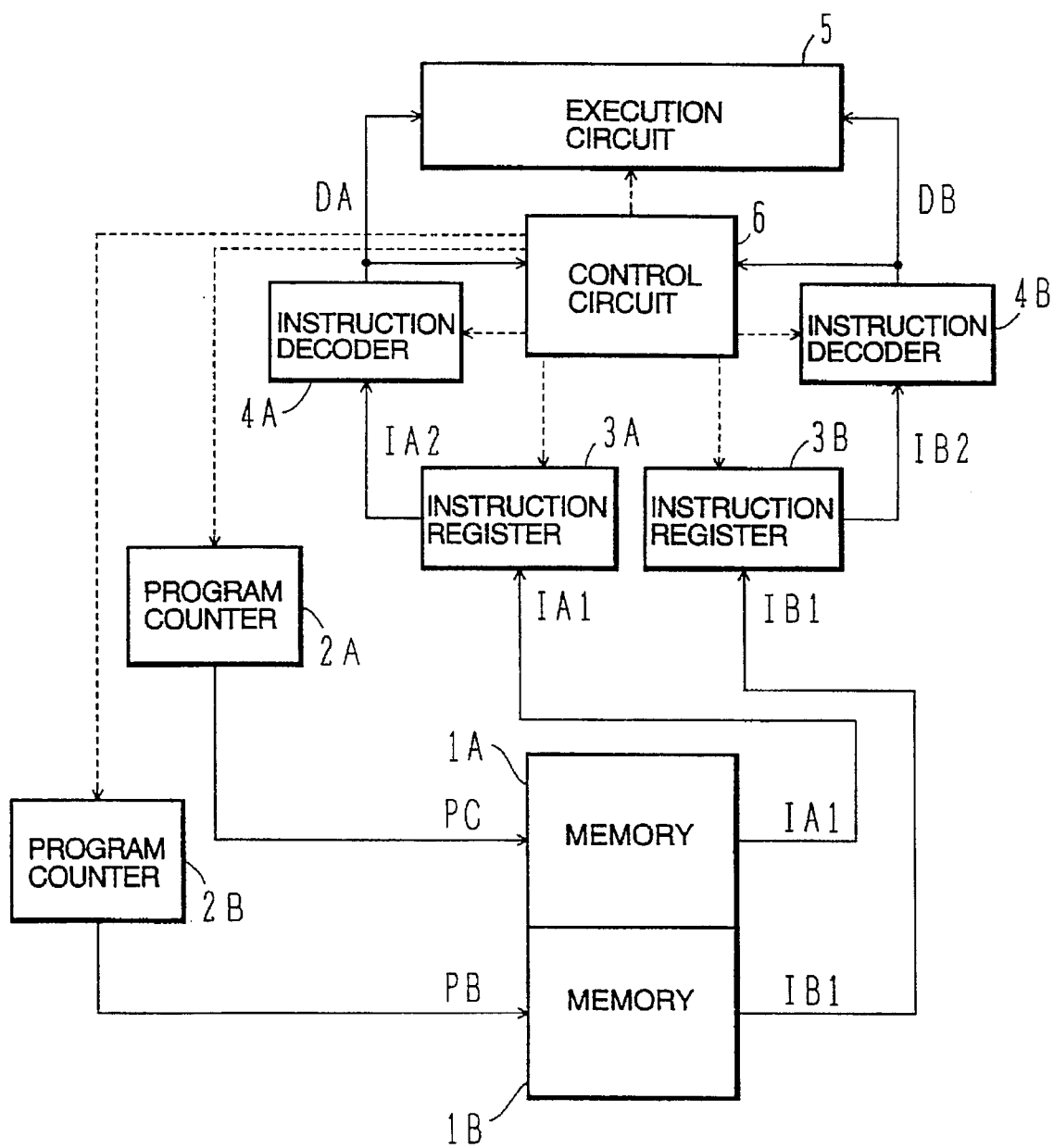
FIG. 1 is a block diagram showing a processor in the first embodiment according to the present invention.

Referring now to the drawings, wherein like reference characters designate like or corresponding parts throughout several views, embodiments of the present invention are described below.

First Embodiment

FIG. 1 shows a processor in the first embodiment according the present invention.

The memory 1A and the memory 1B have an identical structure with equal storage capacity and one program is stored in the two memories 1A and 1B by dividing the program into one word units which are written alternately into each of the two memories. Namely, with the addresses in the memory 1A designated as A0, A1, A2 . . . and with the addresses in the memory 1B designated as B0, B1, B2 . . . , the program is stored in the order: A0, B0, A1, B1, A2, B2, . . . .

The address input terminal of the memory 1A is connected to the output terminal of the program counter 2A via exclusive wires and the address input terminal of the memory 1B is connected to the output terminal of the program counter 2B via exclusive wires. Each of the program counters 2A and 2B has a two stage structure consisting of the normal counter unit, which is the input stage, and the holding (register) unit which is the output stage and, as explained later, the contents PAN which have been updated and confirmed at the input stage, is held at the output stage as PA in response to a control signal.

The data output terminal of the memory 1A is connected to the input terminal of the instruction register 3A via exclusive wires and the data output terminal of the memory 1B is connected to the input terminal of the instruction register 3B via exclusive wires. The memory 1A constantly supplies the contents IA1 at the address PA specified by the program counter 2A to the input terminal of the instruction register 3A and the memory 1B constantly supplies the contents IB1 at the address PB specified by the program counter 2B to the input terminal of the instruction register 3B. The instruction registers 3A and 3B hold IA1 and IB1 respectively, to output them as IA2 and IB2 respectively in response to a strobe signal.

The output terminals of the instruction registers 3A and 3B are connected to the input terminals of the instruction decoders 4A and 4B respectively. Each of the instruction decoders 4A and 4B is provided with an internal register at the input stage and decodes the instruction code held in this register for output as DA or DB.

The output terminals of the instruction decoders 4A and 4B are connected to the input terminals of the execution circuit 5 and the control circuit 6. The execution circuit 5 is provided with a selector at the internal input stage, which selects either DA or DB in response to the selection control signal, and a register that holds the selected DA or DB. Based upon the decoding result, which is the output of the decoder,held in this register, the execution circuit 5 executes processing such as calculation or data transfer in the same manner as an execution circuit in the known art, which is provided with an ALU and internal registers. To simplify the expression, we proceed on the premise that selection either DA or DB means selection either DA or DB and holding it in the register.

These components 1A to 4A, 1B to 4B and 5 operate in accordance with control signals sent from the control circuit 6. These control signals are generated in synchronism with the double phase clocks CA and CB as shown in FIG. 2. The basics of the control performed by the control circuit 6 are as follows:

(1) The control circuit 6 induces the execution circuit 5 to select and execute DA and DB alternately, supplies the selection control signal to the execution circuit 5 with the timing of the rise of the clock CA and induces it to select DB when it has completed the execution of the output of the instruction decoder 4A and induces it to select the decoding result DA when it has completed the execution of the decoding result of the instruction decoder 4B. Then it induces the internal register to hold these decoding result. The initial selection after a reset is DA.

(2) When DA is selected, the control circuit 6 induces the instruction decoder 4A to hold IA2 and when DB is selected, it induces the instruction decoder 4B to hold IB2.

(3) When IA2 is held in the instruction decoder 4A, the control circuit 6 induces the instruction register 3A to hold IA1 and when IB2 is held in the instruction decoder 4B, it induces the instruction register 3B to hold IB1.

(4) The control circuit 6 induces the contents PAN or PBN at the input stage of the program counter 2A or 2B to be held at the output stage as PA or PB with the timing of the rise of the clock CA.

(5) The control circuit 6 induces IA1 to be held in the instruction register 3A or IB1 to be held in the instruction register 3B with the timing of the rise of the clock CB.

(6) The control circuit 6 updates the contents PAN or PBN at the input stage of the program counter 2A or 2B with the timing of the rise of the clock CB. Updating of PAN is usually performed by supplying one pulse to the clock input terminal of the program counter 2A to add one to the counter value, but when the output of the instruction decoder 4A indicates an unconditional branch instruction, is performed by determining the address of the branch destination based upon the output of the instruction decoder 4A and then by loading it to the program counter 2A, and when the output of the instruction decoder 4A indicates a conditional branch instruction, is performed by determining the address of the branch destination based upon the output of the instruction decoder 4A and a status flag and then by loading it to the program counter 2A. The updating of the program counter 2B is executed in the same manner as that of the program counter 2A.

(A) Next, the normal pipeline processing that is performed after the processor is reset until the processor enters the stationary state is explained in reference to FIG. 2.

The starting address for program execution after a reset is designated as n. Although not shown in FIG. 1 or FIG. 2, when the processor is reset, initializing processing is performed in which n is loaded to the input stages of the program counters 2A and 2B and, On the other side, the execution starting address n is supplied to the input terminals of the memory 1A and 1B through another route(not shown).

The rise points in time of the clock CA are assigned odd numbers; t1, t3, t5 . . . and the rise points in time of the clock CB are assigned even numbers; t2, t4, t6 . . . . In addition, IA1, which is read out from the address i in the memory 1A is indicated as IA1(i), and IA2 when IA1(i) is held in the instruction register 3A is indicated as IA2(i). The same rule applies to IB1 and IB2. In the following explanation, the pipeline has 5 stages, consisting of the instruction fetch (IF) stage, the instruction decode (ID) stage, the execution (EX) stage, the memory access (MA) stage and the stage of writing to register (WB). For example, in the case of an instruction with which data are read out from the memory address that is the content of the index register IX with 100 added, to load to the register R; i.e.,

LOAD R, IX+100;

the EX stage is the processing in which 100 is added to the contents of the index register IX to determine the execution address, the MA stage is the processing in which data are read out from this execution address in the memory and the WB stage is the processing in which the data that have been read out are stored in the register R. In the case of an instruction as to register—register operation such as a register-register compare instruction, EX stage is the operation between two registers, MA stages is meaningless and WB stage is the storing the result of the operation in a register. In the case of an immediate data transfer instruction; i.e.,

LDI R, 200

, WB stage is the processing in which an immediate data 200 are stored in the register R, and EX and MA stages are meaningless.

Of the control signals output from the control circuit 6, those shown in FIG. 2 are as follows: the instruction IA decode signal is for inducing the instruction decoder 4A holding IA2, to decode it when it is at high and the instruction IB decode signal is for inducing the instruction decoder 4B holding IB2, to decode it when it is at high. The instruction IA execution signal is for inducing the execution circuit 5 to select and execute DA when it is at high and the instruction IB execution signal is for inducing the execution circuit 5 to select and execute DB when it is at high. IF stage starts from the updating of PA or PB of the program counter 2A or 2B.

(t1) n is loaded to both the program counters 2A and 2B. PA=n and PB=n. The instruction decoders 4A, 4B and the execution circuit 5 are in the wait state.

(t2) IA1(n) and IB1(n) are held in the instruction registers 3A and 3B respectively. One pulse is supplied to the clock input terminals of the program counters 2A and 2B so that PAN=n+1 and PBN=n+1. The instruction decoders 4A, 4B and the execution circuit 5 are in the wait state.

(t3) IA2(n) and IB2(n) are held in the instruction decoders 4A and 4B respectively and decoded. PA=n+1 and PB=n+1. The execution circuit 5 is in the wait state.

(t4) IA1(n+1) and IB1(n+1) are held in the instruction registers 3A and 3B respectively. One pulse is supplied to the clock input terminals of the program counters 2A and 2B so that PAN=n+2 and PBN=n+2. The execution circuit 5 is in the wait state.

(t5) DA(n) is selected by the execution circuit 5 and executed to perform EX stage. On the other side, DB(n) is not selected and the instruction decoder 4B enters the wait state. This wait state means the output of the instruction decoder 4B is not used with outputting the decoding result. IA2(n+1) is held in the instruction decoder 4A and decoded. PA=n+2.

(t6) IA1(n+2) is held in the instruction register 3A. One pulse is supplied to the clock input terminal of the program counter 2A so that PAN=n+3.

(t7) DB(n) is selected by the execution circuit 5 and executed. DA(n+1) is not selected and the instruction decoder 4A enters the wait state. The memory access which corresponds to DA(n) is executed by the control circuit 6. IB2(n+1) is held in the instruction decoder 4B and decoded. PB=n+2.

(t8) IB1(n+2) is held in the instruction register 3B. One pulse is supplied to the clock input terminal of the program counter 2B so that PBN=n+3.

(t9) DA(n+1) is selected by the execution circuit 5 and executed. DB(n+1) is not selected and the instruction decoder 4B enters the wait state. The write to register that corresponds to DA(n) and the memory access which corresponds to DB(n) are executed by the control circuit 6. IA2(n+2) is held in the instruction decoder 4A and decoded. PA=n+3.

The five-stage normal pipeline processing is executed in the manner described above and the operation enters the stationary state.

(B) Now, the pipeline processing for an unconditional branch instruction that is executed after the processor enters the stationary state is explained in reference to FIG. 3.

We proceed on the premise that this unconditional branch instruction is stored at address An (address n in the memory 1A), that a relative branch destination address K is in the word of the unconditional branch instruction and that the relative branch destination address K is an even number 2k and is in memory 1A.

The actual branch destination for the relative branch destination address K is determined in the same manner as with a processor in the prior art, in which the memory 1A and the memory 1B are integrated, by regarding address i in the memory 1A as 2i and also regarding the address i in the memory 1B as 2i+1 for each i that is 0 to M. To put it more concretely, when the unconditional branch instruction is stored in the memory 1A (or the memory 1B) and K is an odd number 2k+1, i.e., when the lowest-order bit of K is "1", the branch destination relative address is equal to the branch destination relative address k in the memory 1B (or the memory 1A) and when K is an even number 2k, i.e., when the lowest-order bit of K is "0," the branch destination relative address is equal to the branch destination relative address k in the memory 1A (or the memory 1B).

The following is an explanation having part of the pipeline processing of an instruction word preceding the address n−1 in the memory 1A and preceding the address n−1 in the memory 1B.

(t1) DA(n−2) is selected by the execution circuit 5 and executed. On the other side, DB(n−1) is not selected and the instruction decoder 4B enters the wait state. IA2(n−1) is held in the instruction decoder 4A and decoded. PA=n.

(t2) The unconditional branch instruction IA1(n) is held in the instruction register 3A. One pulse is supplied to the clock input terminal of the program counter 2A so that PAN=n+1.

(t3) DB(n−2) is selected by the execution circuit 5 and executed. On the other side, DA(n−1) is not selected and the instruction decoder 4A enters the wait state. IB2(n−1) is held in the instruction decoder 4B and decoded. PB=n.

(t4) IB1(n) is held in the instruction register 3B. One pulse is supplied to the clock input terminal of the program counter 2B so that PBN=n+1.

(t5) DA(n−1) is selected by the execution circuit 5 and executed. On the other side, DB(n−1) is not selected and the instruction decoder 4B enters the wait state. IA2(n) is held in the instruction decoder 4A and decoded. PA=n+1.

(t6) IA1(n+1) is held in the instruction register 3A. It is determined by the control circuit 6 that DA(n) indicates an unconditional branch instruction and the k of the relative branch destination address K=2k which is contained in DA(n) is loaded to the program counters 2A and 2B so that PAN=k and PBN=k. With this, the subsequent operation becomes identical to the operation after a reset.

(t7) DB(n−1) is selected by the execution circuit 5 and executed. On the other side, DA(n) is not selected and the instruction decoder 4A enters the wait state. IB2(n) is not held in the instruction decoder 4B (is cancelled). PA=k and PB=k.

(t8) IA1(k) and IB1(k) are respectively held in the instruction registers 3A and 3B. PAN=k+1 and PBN=k+1.

(t9) The decoding result DA(n) of the unconditional branch instruction is selected by the execution circuit 5 and executed without meaning. This is because k has been loaded into the program counters 2A and 2B at the time t6, thus the execution of the unconditional branch has been performed. IA2(k) and IB2(k) are held in the instruction decoders 4A and 4*b* respectively and decoded. PA=k+1 and PB=k+1.

(t10) IA1(k+1) and IB1(k+1) are held in the instruction registers 3A and 3B respectively. PAN=k+2 and PBN=k+2.

(t11) DA(k) is selected by the execution circuit 5 and executed. On the other side, DB(k) is not selected and the instruction decoder 4B enters the wait state. The memory access which corresponds to DA(n) is executed without meaning by the control circuit 6 (the MA stage corresponding to DA(n) is meaningless). IA2(k+1) is held in the instruction decoder 4A and decoded. PA=k+2.

As has been explained, since the unconditional branch instruction and the instruction at the branch destination are executed continuously without any interruption, a delay in processing is prevented. Although FIG. 3 illustrates the case in which the branch destination is Ak, a delay in processing is prevented in a similar manner when the branch destination is Bk.

(C) Next, the pipeline processing for a conditional branch instruction that is executed after the processor enters the stationary state is explained in reference to FIG. 4.

The following discussion is based on the premise that a register—register compare instruction is stored at address An, that the conditional branch instruction is stored at address Bn and that the branch destination address is determined to be either An+1 or Bk depending upon the result of the execution of this compare instruction in EX stage.

In FIG. 4, the operation from the time point t1 through the time point t7 is obvious from the above explanation in reference to FIGS. 2 and 3, and it is, therefore, omitted here. The time points t3 to t7 correspond to the time points t1 to t5 in FIG. 3.

(t8) it is determined by the control circuit 6 that DB(n) is a conditional branch instruction. With this decision, the k of the relative branch destination address K=2k, which is contained in DB(n), is loaded to the program counter 2B so that PBN=k. Then k+1 is loaded to the program counter 2A as the address following the Bk so that PAN=k+1. With this, the subsequent operation becomes similar to that performed after a reset.

(t9) The decoding result DA(n) of the compare instruction is selected by the execution circuit 5 and executed. On the other side, DB(n) is not selected and the instruction decoder 4B enters the wait state. IA2(n+1) is held in the instruction decoder 4A and decoded. PB=k+1 and PB=k.

(t10) IA1(k+1) and IB1(k) are is held in the instruction registers 3A and 3B respectively. One pulse is supplied to the clock input terminals of the program counters 2A and 2B so that PAN=k+2 and PBN=k+1.

(t11) With the result of the execution of the compare instruction described above, the branch destination of the conditional branch instruction is determined. In FIG. 4, the branch destination address is determined to be Bk and DA(n+1) is cancelled. The decoding result DB(n) of the conditional branch instruction is selected by the execution circuit 5 and executed formally. The memory access that corresponds to DA(n) is executed without meaning by the control circuit 6 (the MA stage corresponding to DA(n) is meaningless). IA2(k+1) and IB2(k) are held in the instruction decoders 4A and 4B respectively and decoded. PB=k+1.

(t12) IB1(k+1) is held in the instruction register 3B. PBN=k+2.

(t13) The decoding result DB(k) of the instruction at the branch destination is selected by the execution circuit 5 and executed. On the other side, DA(k+1) is not selected and the instruction decoder 4A enters the wait state. The write to register that corresponds to DA(n) and the memory access that corresponds to DB(n) are executed without meaning by the control circuit 6 (the WB stage corresponding to DA(n) and the HA stage corresponding to DB(n) are meaningless). IB2(k+1) is held in the instruction decoder 4A and decoded. PA=k+2.

As has been explained, since the conditional branch instruction and the instruction at the branch destination are executed continuously without any interruption, a delay in processing is prevented. Although FIG. 4 illustrates a case in which the branch destination is Bk, a delay in processing is prevented in a similar manner when the branch destination is Ak.

Second Embodiment

Figure 5:
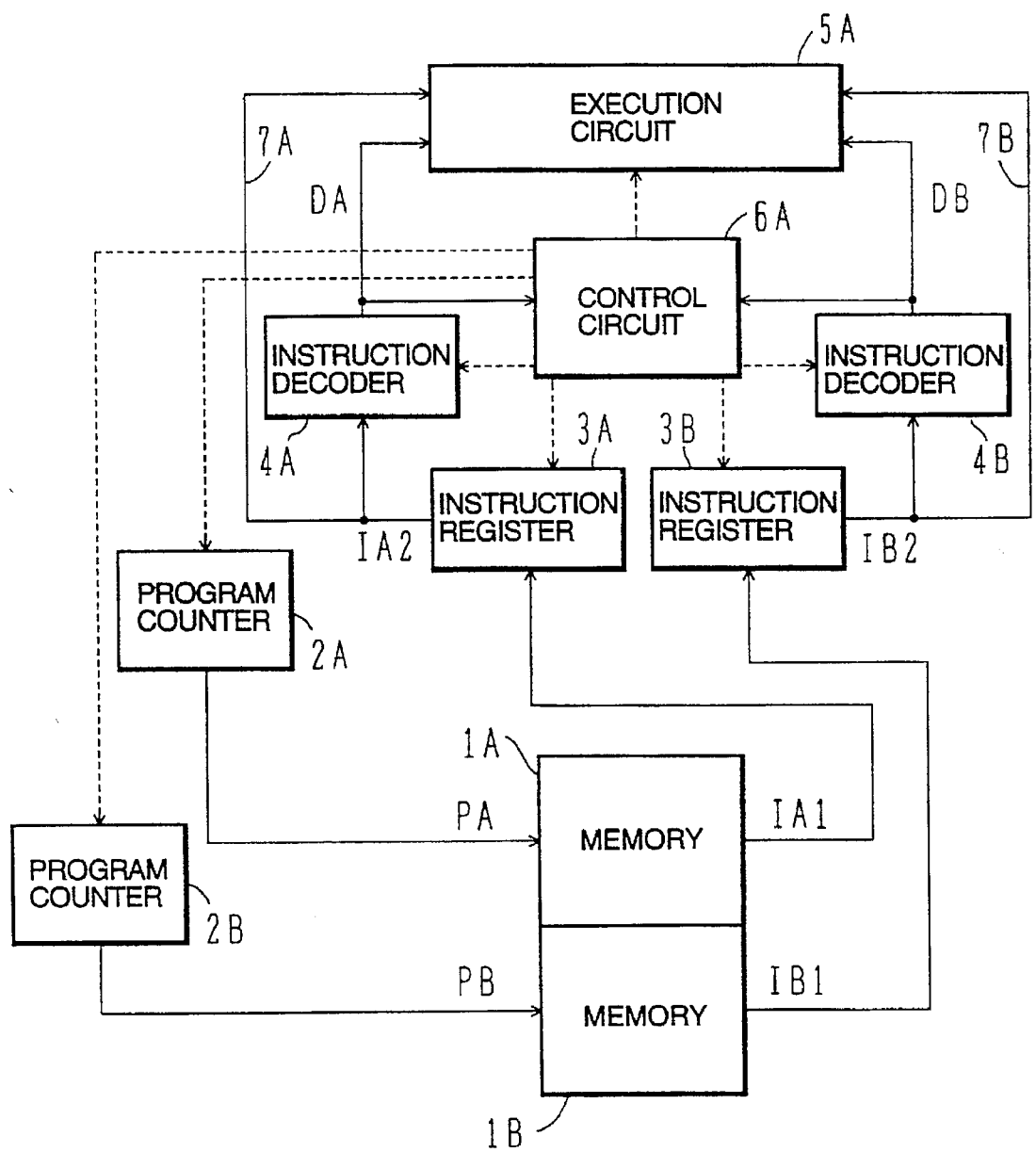
FIG. 5 is a block diagram showing a processor in the second embodiment according to the present invention.

FIG. 5 shows a processor in the second embodiment according to the present invention.

In this processor, in order to supply the immediate data at the second word in an immediate data transfer instruction directly to the execution circuit 5A from the instruction registers 3A and 3B, the output terminals of the instruction registers 3A or 3B are directly connected to the input terminals of the execution circuit 5A via the bypass 7A and 7B respectively.

When the control circuit 6A determines that the output of the instruction decoder 4A or 4B indicates an immediate data transfer instruction, it induces the execution circuit 5A to directly hold IA2 or IB2 via the bypass 7A or 7B and to execute it in one cycle.

All other aspects are identical to those of the processor shown in FIG. 1.

FIG. 6 shows the pipeline processing for the immediate data transfer instruction after the processor has entered the stationary state.

We proceed on the premise that the first word of the immediate data transfer instruction is stored at the address An and that the immediate data, i.e., the second word of the immediate data transfer instruction, are stored at the address Bn.

(t1) DA(n−2) is selected by the execution circuit 5A and executed. On the other side, DB(n−2) is not selected and the instruction decoder 4B enters the wait state. IA2(n−1) is held in the instruction decoder 4A and decoded. PA=n.

(t2) The unconditional branch instruction IA1(n) is held in the instruction register 3A. One pulse is supplied to the clock input terminal of the program counter 2A so that PAN=n+1.

(t3) DB(n−2) is selected by the execution circuit 5A and executed. On the other side, DA(n−1) is not selected and the instruction decoder 4A enters the wait state. IB2(n−1) is held in the instruction decoder 4B and decoded. PB=n.

(t4) The immediate data IB1(n) is held in the instruction register 3B. One pulse is supplied to the clock input terminal of the program counter 2B so that PBN=n+1.

(t5) DA(n−1) is selected by the execution circuit 5A and executed. On the other side, DB(n−1) is not selected and the instruction decoder 4B enters the wait state. IA2(n) is held in the instruction decoder 4A and decoded. PA=n+1.

(t6) IA1(n+1) is held in the instruction register 3A. PAN=n+2. The control circuit 6A determines that DA(n) indicates an immediate data transfer instruction and therefore, that IB2(n) is immediate data.

(t7) Based upon the above determination, IB2(n) is not held in the instruction decoder 4B but is held in the internal register of the execution circuit 5A via the bypass 7B. DB(n−1) is selected by the execution circuit 5A and executed. DA(n) is not selected and the instruction decoder 4A enters the wait state. PB=n+1.

(t8) IB1(n+1) is held in the instruction register 3B. PBN=n+2.

(t9) The decoding result DA(n) of the immediate data transfer instruction is selected and executed without meaning by the execution circuit 5A (the EX stage corresponding to DA(n) is meaningless). IA2(n+1) and IB2(n+1) are held in the instruction decoders 4A and 4B respectively and are decoded. PA=n+2 and PB=n+2.

(t10) IA1(n+2) and IB1(n+2) are held in the instruction registers 3A and 3B respectively. PAN=n+3.

(t11) DA(n+1) is selected by the execution circuit 5A and executed. On the other side, DB(n+1) is not selected and the instruction decoder 4B enters the wait state. The memory access that corresponds to DA(n) is executed without meaning by the control circuit 6A (the HA stage corresponding to DA(n) is meaningless). IA2(n+2) is held in the instruction decoder 4A and decoded.

The data transfer of an immediate data to a register is executed in the WB stage corresponding to DA(n).

As has been explained so far, the double length immediate data transfer instruction which includes immediate data is executed without interruption in one cycle, preventing any delay in processing.

Third Embodiment

Figure 7:
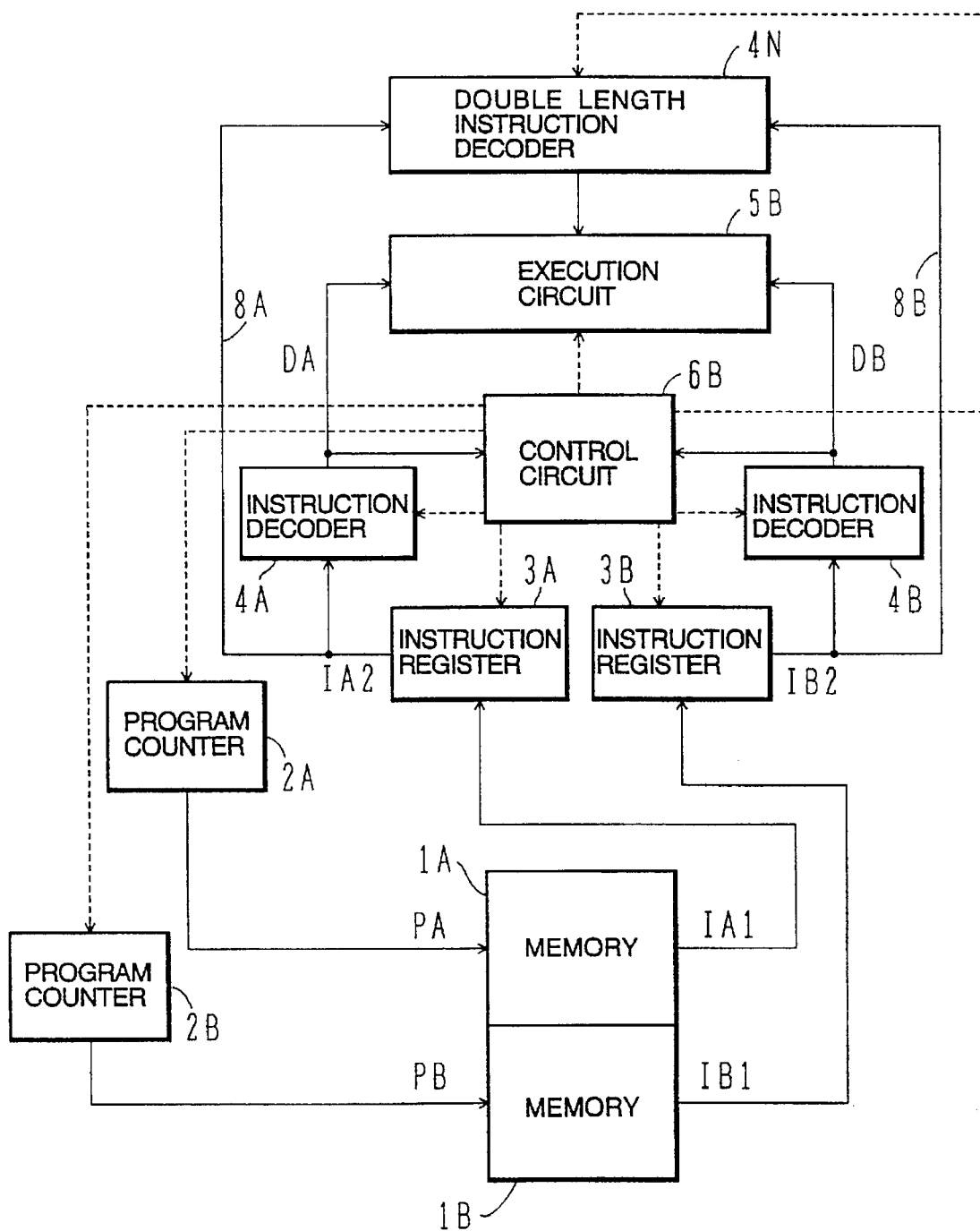
FIG. 7 is a block diagram showing a processor in the third embodiment according to the present invention.

FIG. 7 shows a processor in the third embodiment according to the present invention.

In order to execute a double length instruction faster, this processor is provided with a double length instruction decoder 4N in addition to the instruction decoders 4A and 4B. The output terminals of the instruction registers 3A and 3B are connected to the input terminals of the double length instruction decoder 4N, and the output terminal of the double length instruction decoder 4N is connected to the input terminal of the execution circuit 5B. The double length instruction decoder 4N is provided with a register that holds IA2 and IB2 at its internal input stage and decodes double length instructions held in this register.

When the control circuit 6B decides that the output of the instruction decoder 4A or 4B indicates a double length instruction, it induces the double length instruction decoder 4N to hold IA2 A and IB2 and induces it to decode the double length instruction. The decoding of the double length instruction is executed in one cycle.

All other aspects are identical to those of the processor shown in FIG. 1.

FIG. 8 shows the pipeline processing for a double length instruction when the processor has entered the stationary state.

In FIG. 8, the double length decode signal is for the execution circuit 6B to induce the double length instruction decoder 4N to hold IA2 and IB2 and decode them when it is at high.

We proceed on the premise that one double length instruction is stored at the addresses An and Bn. Since the operation at the time points t1 to t5 is identical to that at the time points t1 to t5 in FIG. 3, its explanation is omitted here.

(t6) IA2(n+1) is held in the instruction register 3A. PAN=n+2. The control circuit 6B determines that DA(n) indicates the first word of the double length instruction.

(t7) DB(n−1) is selected by the execution circuit 5B and executed. Based upon the decision described above, IA2 (n) and IB2(n) are held at the input stage of the double length instruction decoder 4N and decoded. On the other side, after this holding, IA2(n+1) is held in the instruction decoder 4A, and decoded. PA=n+2 and PB=n+1.

(t8) IA1(n+2) is held in the instruction register 3A and IB1(n+1) is held in the instruction register 3B. PAN=n+3 and PBN=n+2.

(t9) The decoding result of the double length instruction decoder 4N is selected by the execution circuit 5B and executed. IA2(n+1) is held in the instruction decoder 4A and is decoded. PB=n+2.

(t10) IB1(n+2) is held in the instruction register 3B. PBN=n+3.

(t11) DA(n+1) is selected by the execution circuit 5B and executed. On the other side, DB(n+1) is not selected and the instruction decoder 4B enters the wait state. The memory accesses that correspond to DA(n) and DB(n) is executed by the control circuit 6B. IA2(n+2) is held in the instruction decoder 4A and decoded. PA=n+3.

As has been explained so far, the double length instruction is executed without interruption in one cycle, thus preventing a delay in processing.

Fourth Embodiment

Figure 9:
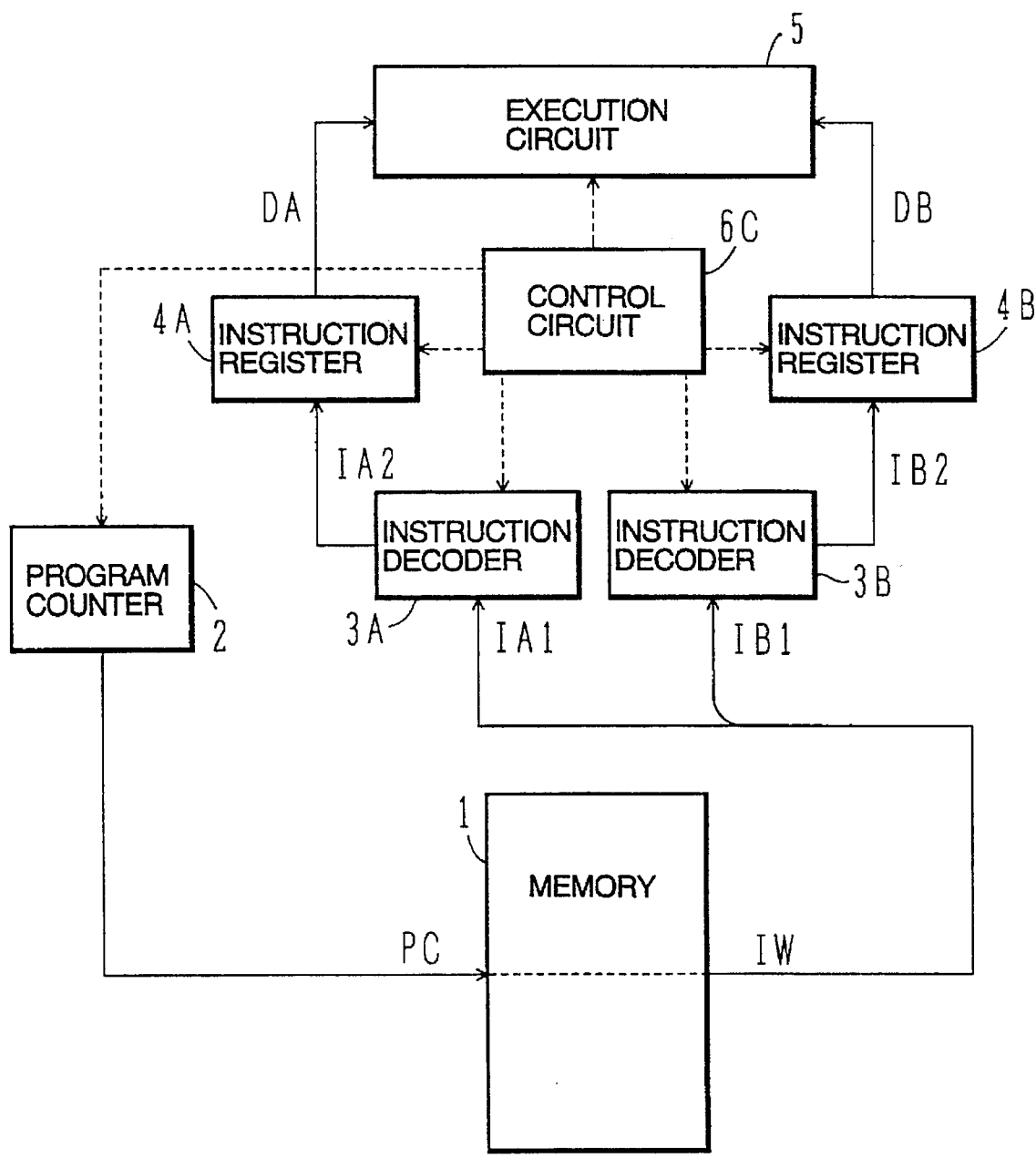
FIG. 9 is a block diagram showing a processor in the fourth embodiment according to the present invention.

FIG. 9 shows a processor in the fourth embodiment according to the present invention.

In order to induce its structure simpler than that in the first embodiment described above, in this processor, the bit length of the memory 1 is two words as shown in FIG. 10, and when the address PC=i is specified for the memory 1, the two word instruction IW(i) consisting of the instruction words IA1(i) and IB1(i) are read out. IA1(i) and IB1(i) are held in the instruction registers 3A and 3B shown in FIG. 9, respectively. Because of this, there is only one program counter 2 for the memory 1. The output IA2 and IB2 of the instruction registers 3A and 3B are held in the instruction decoders 4A and 4B respectively and are decoded. With this structure, the control performed by the control circuit 6C also becomes simpler in comparison with the first embodiment described above.

The basics of the control performed by the control circuit 6C are as follows:

(1) The control circuit 6 induces the execution circuit 5 to alternately select and execute DA and DB and supplies the selection control signal to the execution circuit 5 with the timing of the rise of the clock CA (FIG. 2). When the execution of the decoding result of the instruction decoder 4A has been completed the execution circuit 5, it induces the execution circuit 5 to select DB, and when the execution of the decoding result of the instruction decoder 4B has been completed, it induces the execution circuit 5 to select the decoding result of DA. It induces the internal register to hold these decoding result.

(2) When DA is selected by the execution circuit 5, the instruction decoder 4A holds IA2 and when DB is selected, the instruction decoder 4B holds IB2.

(3) Every time one set of memory DA and DB is selected, the contents PCN at the input stage of the program counter 2 are held at the output stage with the timing of the rise of the clock CA and are output as PC.

(4) With the timing of the rise of the clock CB (FIG. 2), IA1 and IB1 are held in the instruction registers 3A and 3B respectively and PCN is updated.

(A) Next, the normal pipeline processing that is performed after the processor is reset until the processor enters the stationary state is explained in reference to FIG. 11. The initializing processing not shown in figure, that is performed immediately after a reset, is identical to that performed in the first embodiment described above.

(t1) PC=n. IW(n)={IA1(n), IB(n)} is read out from the memory 1. The instruction decoders 4A, 4B and the execution circuit 5 are in the wait state.

(t2) IA1(n) and IB1(n) are held in the instruction registers 3A and 3B respectively. PCN=n+1.

(t3) IA2(n) and IB2(n) are held in the instruction decoders 4A and 4B respectively and decoded. PC=n+1. The execution circuit 5 is in the wait state.

(t4) IA1(n+1) and IB1(n+1) are held in the instruction registers 3A and 3B respectively. PCN=n+2.

(t5) DA(n) is selected by the execution circuit 5 and executed. On the other side, DB(n) is not selected and the instruction decoder 4B enters the wait state. IA2(n+1) is held in the instruction decoder 4A and decoded.

(t7) DB(n) is selected by the execution circuit 5 and executed. DA(n+1) is not selected and the instruction decoder 4A enters the wait state. The memory access that corresponds to DA(n) is executed by the control circuit 6C. IB2(n+1) is held in the instruction decoder 4B and decoded. PC=n+2.

(t8) The memory access that corresponds to DA(n) is executed by the control circuit 6C. IA1(n+2) and IB1(n+2) are respectively held in the instruction registers 3A and 3B. PCN=n+3.

(t9) DA(n+1) is selected by the execution circuit 5 and executed. The write to register that corresponds to DA (n) and the memory access that corresponds to DB(n) are executed by the control circuit 6C. DB(n+1) is not selected and the instruction decoder 4B enters the wait state. IA2(n+2) is held in the instruction decoder 4A and decoded.

As has been explained so far, normal pipeline processing of 5 stages is performed and then the processor enters the stationary state.

(B) Next, the pipeline processing for an unconditional branch instruction that is executed after the processor enters the stationary state is explained in reference to FIG. 12. The conditions for the unconditional branch instruction are the same as those given in the case in FIG. 3.

(t1) DB(n−2) is selected by the execution circuit 5 and executed. On the other side, DA(n−1) is not selected and the instruction decoder 4A enters the wait state. IB2(n−1) is held in the instruction decoder 4B and decoded. PC=n.

(t2) The unconditional branch instruction IA1(n) is held in the instruction register 3A and at the same time, IB1(n) is held in the instruction register 3B. PCN=n+1.

(t3) DA(n−1) is selected by the execution circuit 5 and executed. On the other side, DB(n−1) is not selected and the instruction decoder 4B enters the wait state. IA2(n) is held in the instruction decoder 4A and decoded.

(t4) The control circuit 6C decides that DA(n) indicates an unconditional branch instruction and the k of the relative branch destination address K=2k which is contained in DA(n) is loaded into the program counter 2 so that PCN=k. With this, the subsequent operation becomes identical to that after a reset.

(t5) DB(n−1) is selected by the execution circuit 5 and executed. On the other side, DA(n) is not selected and the instruction decoder 4A enters the wait state. IB2(n) is not held in the instruction decoder 4B (is cancelled). PC=k.

(t6) IA1(k) and IB1(k) are respectively held in the instruction registers 3A and 3B. PCN=k+1.

(t7) The decoding result DA(n) of the unconditional branch instruction is selected and executed without meaning by the execution circuit 5 (the EX stage corresponding to DA(n) is meaningless). IA2(k) and IB2(k) are held in the instruction decoder 4A and 4B respectively, and decoded. PC =k+1.

(t8) IA1(k+1) and IB1(k+1) are respectively held in the instruction registers 3A and 3B. PCN=k+2.

(t9) DA(k) is selected by the execution circuit 5 and executed. On the other side, DB(k) is not selected and the instruction decoder 4B enters the wait state. The memory access that corresponds to DA(n) is executed without meaning by the control circuit 6C (the MA stage corresponding to DA (n) is meaningless). IA2(k+1) is held in the instruction decoder 4A and decoded.

As has been explained so far, since the unconditional branch instruction and the instruction at the branch destination are executed continuously without any interruption, a delay in processing is prevented. Although FIG. 12 illustrates the case in which the branch destination is Ak, a delay in processing is prevented in the same way when the branch destination is Bk.

(C) Next, the pipeline processing for a conditional branch instruction that is executed after the processor enters the stationary state is explained in reference to FIG. 13. Conditions for the conditional branch instruction are identical to those given in FIG. 4 except that here, the branch destination is Ak.

In FIG. 13, the operation from time point t1 through time point t3 is identical to the operation performed from time point t1 through time point t3 in FIG. 12 and its explanation is omitted. There is no change at t4.

(t5) PC=n+1. DB(n−1) is selected by the execution circuit 5 and executed. On the other side, DA(n) is not selected and the instruction decoder 4A enters the wait state. The conditional branch instruction IB2(n) is held in the instruction decoder 4B and decoded.

(t6) IA1(n+1) and IB1(n+1) are held in the instruction registers 3A and 3B respectively. The control circuit 6C decides that DB(n) indicates a conditional branch instruction and the k of the relative branch destination address K=2k which is contained in DB(n) is loaded into the program counter 2. The subsequent operation becomes similar to that performed after a reset.

(t7) The decoding result DA(n) of the compare instruction is selected and executed by the execution circuit 5. DB(n) is not selected and the instruction decoder 4B enters the wait state. IA2(n+1) is held in the instruction decoder 4A and decoded. PC=k.

(t8) IA1(k) and IB1(k) are held in the instruction registers 3A and 3B respectively. PCN=k+1.

(t9) Based upon the result of the execution of the compare instruction described above, the branch destination for the conditional branch instruction is determined. In FIG. 13, the branch destination address is determined to be Ak and DA(n+1) and IB2(n+1) are cancelled. The decoding result DB(n) of the conditional branch instruction is selected and executed without meaning by the execution circuit 5 and the memory access that corresponds to DA(n) is executed without meaning by the control circuit 6C (the EX stage corresponding to DB(n) and the 4A stage corresponding to DA(n) are meaningless). IA2(K) and IB2(k) are held in the instruction decoders 4A and 4B respectively and decoded. PC=k+1.

(t10) IA1(k+1) and IB1(k+1) are held in the instruction registers 3A and 3B respectively and PCN=k+2.

(t11) The decoding result DA(k) of the instruction at the branch destination, is selected by the execution circuit 5 and executed. On the other side, DB(k) is not selected and the instruction decoder 4B enters the wait state. The write to register that corresponds to DA(n) and the memory access that corresponds to DB(n) are executed without meaning by the control circuit 6C (the WB stage corresponding to DA(n) and the MA stage corresponding to DB (n) are meaningless). IA2(k+1) is held in the instruction decoder 4A and decoded.

As has been explained so far, since the conditional branch instruction and the instruction at the branch destination are executed continuously without any interruption, a delay in processing is prevented. Although FIG. 13 illustrates the case in which the branch destination is Ak, a delay in processing is prevented in the same way when the branch destination is Bk.

Fifth Embodiment

Figure 14:
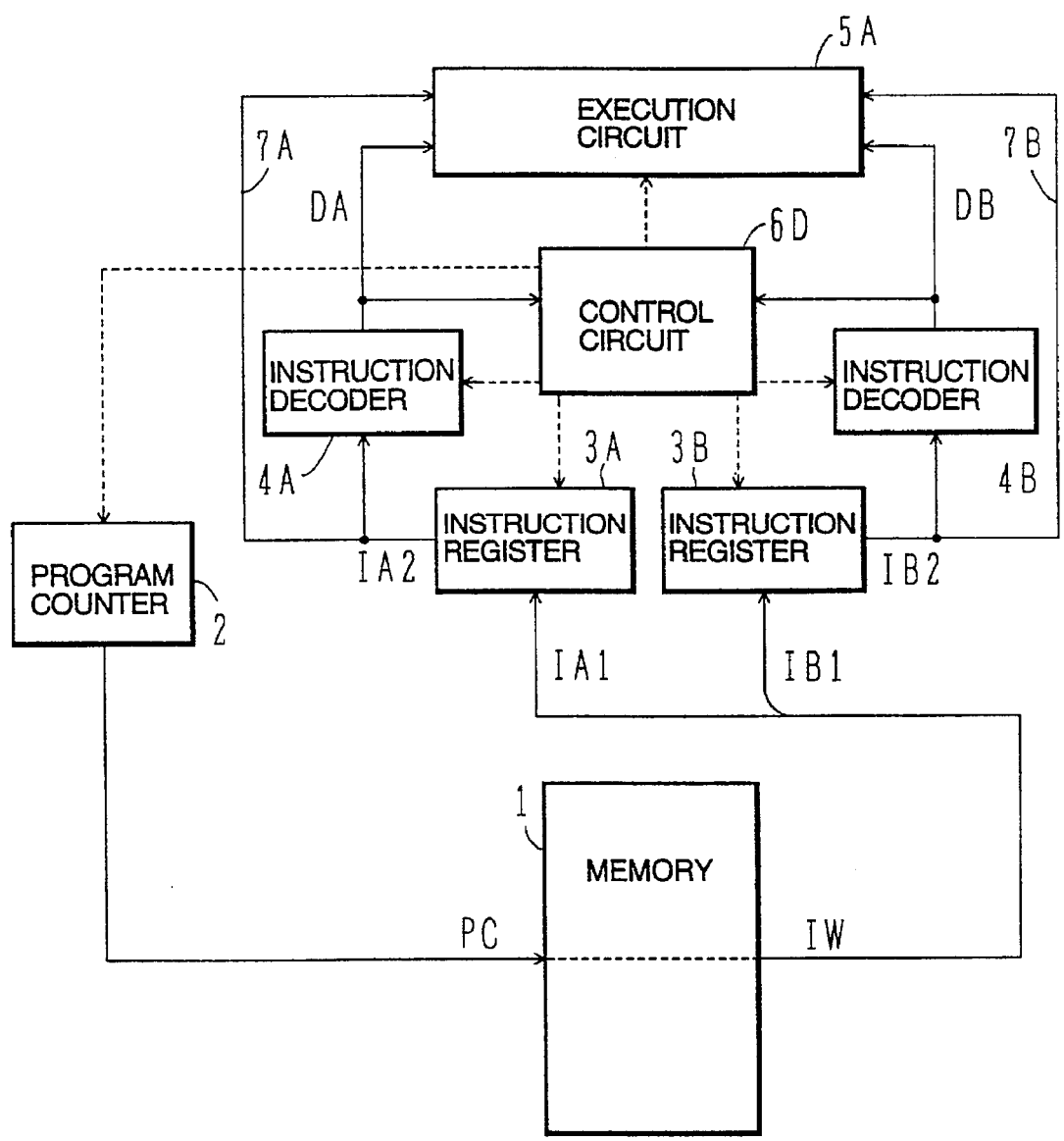
FIG. 14 is a block diagram showing a processor in the fifth embodiment according to the present invention.

FIG. 14 shows the processor in the fifth embodiment according to the present invention.

This processor is a simplified version of the structure shown in FIG. 5, having incorporated a similar simplification to that shown in FIG. 9. Namely, in order to directly supply the immediate data at the second word of an immediate data transfer instruction to the execution circuit 5A from the instruction registers 3A or 3B, the output terminals of the instruction registers 3A and 3B are directly connected to the input terminals of the execution circuit 5A via the bypass 7A and 7B respectively.

FIG. 15 shows the pipeline processing for an immediate data transfer instruction executed after the processor enters the stationary state. The conditions for the immediate data transfer instruction are the same as those set in FIG. 6.

The operation from time point t1 through t4 in FIG. 15 is identical to the operation performed from time point t1 through t4 in FIG. 13 and its explanation is omitted here. The control circuit 6D decides between the time points t3 and t5 that DA(n) indicates an immediate data transfer instruction.

(t5) PC=n+1. DB(n−1) is selected by the execution circuit 5A and executed. On the other side, DA(n) is not selected and the instruction decoder 4A enters the wait state. With the decision described above, IB2(n) goes through the bypass 7B and is directly held in the internal register of the execution circuit 5A as immediate data.

(t6) IA1(n+1) and IB1(n+1) are held in the instruction registers 3A and 3B respectively. PCN=n+2.

(t7) The decoding result DA(n) of the immediate data transfer instruction is selected by the execution circuit 5A and executed without meaning. IA2(n+1) and IB2(n+1) are held in the instruction decoders 4A and 4B respectively and decoded. PC=n+2.

(t8) IA1(n+2) and IB1(n+2) are held in the instruction registers 3A and 3B respectively. PCN=n+3.

(t9) DA(n+1) is selected by the execution circuit 5A and executed. On the other side, DB(n+1) is not selected and the instruction decoder 4B enters the wait state. The memory access that corresponds to DA(n) is executed without meaning by the control circuit 6D. IA2(n+2) is held in the instruction decoder 4A and decoded.

The data transfer of a double length immediate data to a register is executed in the WB stage corresponding to DA(n).

As has been explained so far, since the double length immediate data transfer instruction is executed without interruption in one cycle, a delay in processing is prevented.

Sixth Embodiment

Figure 16:
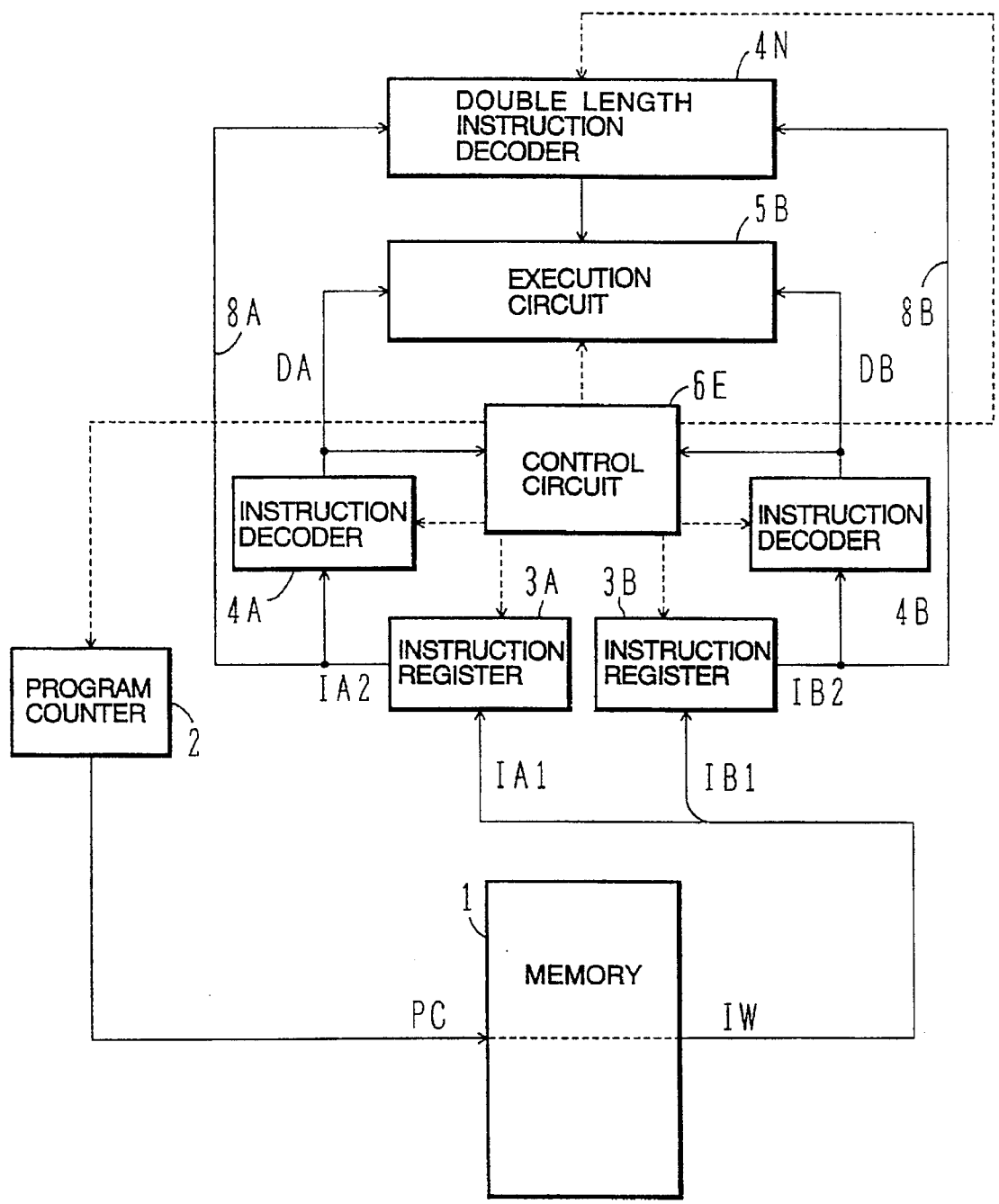
FIG. 16 is a block diagram showing a processor in the sixth embodiment according to the present invention.

FIG. 16 shows the processor in the sixth embodiment according to the present invention.

This processor is a simplified version of the structure shown in FIG. 7, having incorporated a similar simplification to that shown in FIG. 9. Namely, in order to execute a double length instruction faster, a double length instruction decoder 4N is added, in addition to the instruction decoders 4A nd 4B, to the structure shown in FIG. 9 and the output terminals of the instruction registers 3A and 3B are connected to the input terminal of the double length instruction decoder 4N via the wires 8A and 8B respectively and the output terminals of the double length instruction decoder 4N is connected to the input terminal of the execution circuit 5B.

FIG. 17 shows the pipeline processing for a double length instruction executed after the processor enters the stationary state. The conditions for the double length instruction are the same as those set in the case in FIG. 8.

(t1) DB(n−2) is selected by the execution circuit 5B and executed. On the other side, DA(n−1) is not selected and the instruction decoder 4A enters the wait state. IB2(n−1) is held in the instruction decoder 4B and decoded. PC=n.

(t2) The first word IA1(n) and the second word IB1(n) of the double length instruction are held in the instruction registers 3A and 3B respectively. PCN=n+1.

(t3) DA(n−1) is selected by the execution circuit 5B and executed. On the other side, DB(n−1) is not selected and the instruction decoder 4B enters the wait state. IA2(n) is held in the instruction decoder 4A and decoded.

(t4) The control circuit 6E decides that DA(n) indicates a double length instruction.

(t5) Based upon the decision described above, the instruction decoders 4A and 4B enter the wait state. On the other side, IA2(n) and IB2(n) are held in the double length instruction decoder 4N via the wires 8A and 8B respectively and the double length instruction is decoded. DB(n−1) is selected and executed by the execution circuit 5B. PC=n+1.

(t6) IA1(n+1) and IB1(n+1) are held in the instruction registers 3A and 3B respectively and PCN=n+2.

(t7) The decode results DA(n) and DB(n) of the double length instruction are executed by the execution circuit 5B. IA2(n+1) and IB2(n+1) are held in the instruction decoders 4A and 4B respectively and decoded. PC=n+2.

(t8) IA1(n+2) and IB1(n+2) are held in the instruction registers 3A and 3B respectively. PCN=n+3.

(t9) DA(n+1) is selected by the execution circuit 5B and executed. On the other side, DB(n) is not selected and the instruction decoder 4B enters the wait state. The memory accesses that correspond to DA(n) and DB(n) are executed by the control circuit 6E. IA2(n+2) is held in the instruction decoder 4A and is decoded.

As has been explained so far, since the double length instruction is executed without interruption in one cycle, a delay in processing is prevented.

Seventh Embodiment

Figure 18:
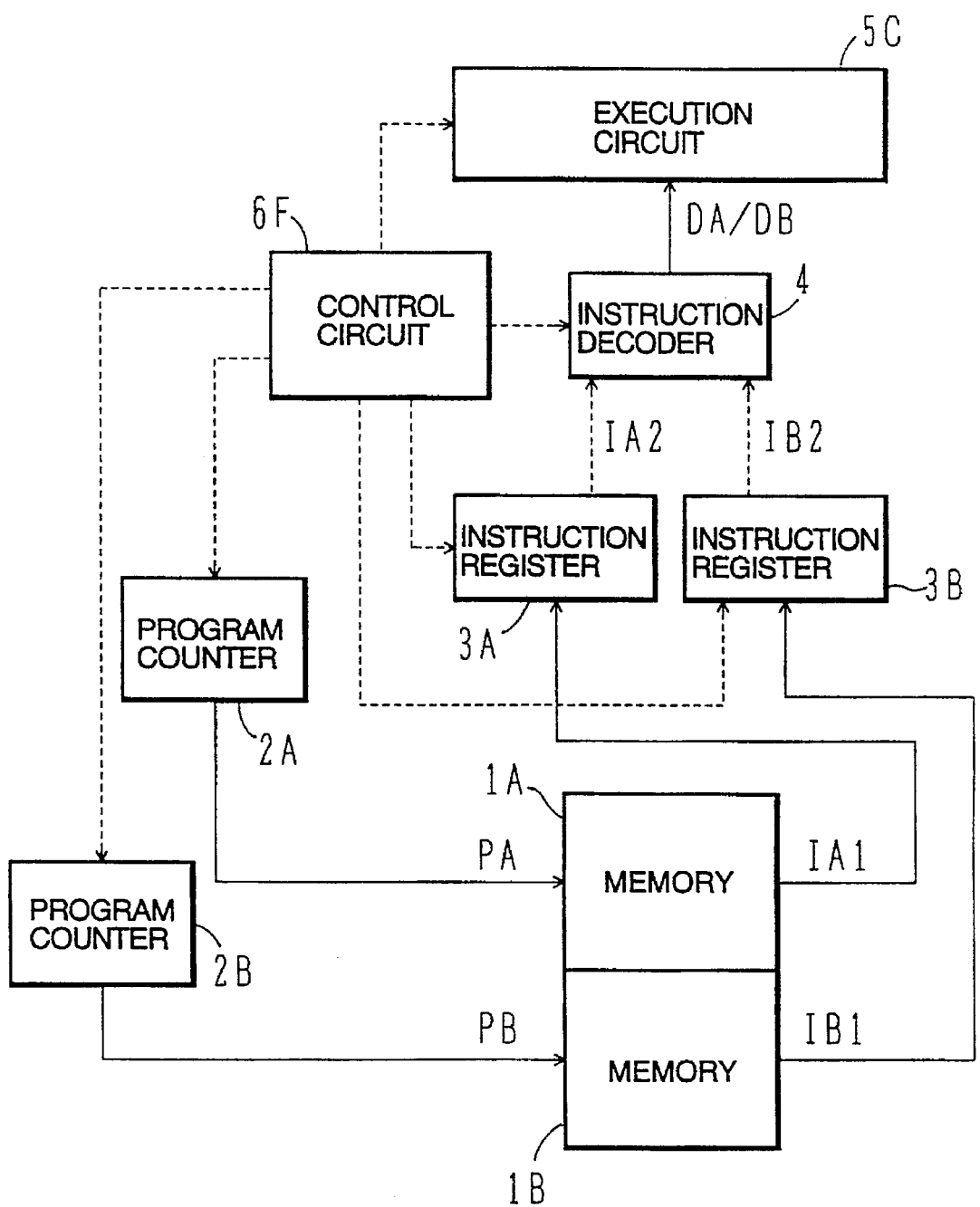
FIG. 18 is a block diagram showing a processor in the seventh embodiment according to the present invention.

FIG. 18 shows the processor in the seventh embodiment according to the present invention.

In this processor, in order to simplify the structure compared to that shown in FIG. 1, only one instruction decoder 4 is used. Since there is only one instruction decoder 4, the input stage inside the execution circuit 5C is not provided with a selector and instead a selector which selects either the output of the instruction register 3A or 3B is provided at the next stage of the register located at the input stage within the instruction decoder 4. The only difference between the execution circuit 5C and the execution circuit 5 shown in FIG. 1, is that the execution circuit 5C is not provided with a selector at the internal input stage. The only difference between the instruction decoder 4 and the instruction de 4A shown in FIG. 1, is that the instruction decoder 4 is provided with the selector at the internal input stage.

Since there is only one instruction decoder 4, the control performed by the control circuit 6F is simpler than that performed by the control circuit 6 shown in FIG. 1. When IA2 is held in the instruction decoder 4, the control circuit 6F adds one to the PAN and induces the instruction register 3A to hold IA1. When IB2 is held in the instruction decoder 4, the control circuit 6F adds one to the PBN and induces the instruction register 3B to hold IB1.

All other aspects of this processor are identical to those of the processor shown in FIG. 1.

The normal pipeline processing that is performed after the processor is reset and until the processor enters the stationary state is explained in reference to FIG. 19. The initializing processing not shown in the figure that is executed immediately after a reset is identical to that performed in the first embodiment described earlier.

(t1) PA=n and PB=n. The instruction decoder 4 and the execution circuit 5C are in the wait state.

(t2) IA1(n) and IB1(n) are held in the instruction registers 3A and 3B respectively. PAN=n+1 and PBN=n+1.

(t3) IA2(n) is held in the instruction decoder 4 and is decoded. IB2(n) enters the wait state. PA=n+1. The execution circuit 5C is in the wait state.

(t4) IA1(n+1) is held in the instruction register 3A. PAN=n+2.

(t5) DA(n) is held by the execution circuit 5C and executed. IB2(n) is held in the instruction decoder 4 and decoded. PB=n+1.

(t6) IB1(n+1) is held in the instruction register 3B. PBN=n+2.

(t7) DB(n) is executed by the execution circuit 5C. The memory access that corresponds to DA(n) is executed by the control circuit 6F. IA2(n+1) is held in the instruction decoder 4 and decoded. PA=n+2.

(t8) IA1(n+2) is held in the instruction register 3A. PAN=n+3.

(t9) DA(n+1) is executed by the execution circuit 5C. The memory write that corresponds to DB(n) and the write to register that corresponds to DA(n) are executed by the control circuit 6F. IB2(n+1) is held in the instruction decoder 4 and decoded. PB=n+2.

The normal pipeline processing with 5 stages is executed in the manner described above and the processor enters the stationary state. Since the pipeline processing for an unconditional branch instruction and a conditional branch instruction executed after the processor enters the stationary state can be easily understood from the earlier explanation, its explanation is omitted here. With this processor too, the advantage that has been described already, that an unconditional branch instruction and a conditional branch instruction can be executed without interruption in one cycle, is achieved.

Eighth Embodiment

Figure 20:
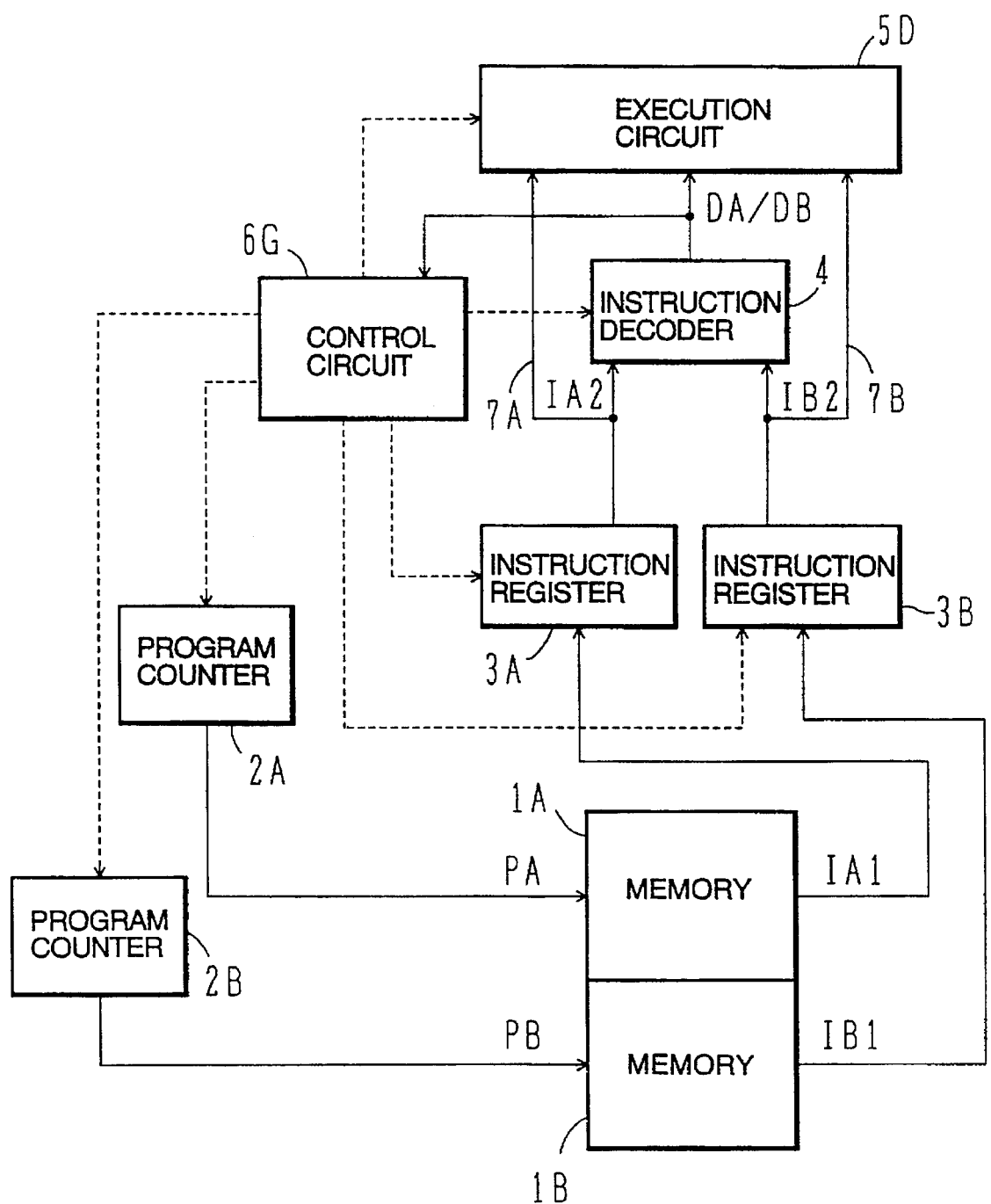
FIG. 20 is a block diagram showing a processor in the eighth embodiment according to the present invention.

FIG. 20 shows the processor in the eighth embodiment according to the present invention.

This processor is a simplified version of the structure shown in FIG. 5, having incorporated a similar simplification to that shown in FIG. 18. Namely, in order to directly supply the immediate data at the second word of an immediate data transfer instruction to the execution circuit 5D from the instruction registers 3A or 3B, the output terminals of the instruction registers 3A and 3B are directly connected to the input terminals of the execution circuit 5D via the bypass 7A and 7B respectively.

FIG. 21 shows the pipeline processing for an immediate data transfer instruction that is executed after the processor enters the stationary state. The conditions for the immediate data transfer instruction are the same as those in the case in FIG. 6.

(t1) DB(n−2) is held by the execution circuit 5D and executed. PA=n. IA2(n−1) is held in the instruction decoder 4 and decoded.

(t2) IA1(n) is held in the instruction register 3A. PAN=n+1.

(t3) DA(n−1) is held by the execution circuit 5D and executed. IB2(n−1) is held in the instruction decoder 4 and decoded. PB=n.

(t4) IB1(n) is held in the instruction register 3B. PBN=n+1.

(t5) DB(n−1) is held by the execution circuit 5D and executed. The immediate data transfer instruction IA2(n) is held in the instruction decoder 4 and is decoded. PA=n+1.

(t6) IA1(n+1) is held in the instruction register 3A so that PAN=n+2. The control circuit 6G decides that IA2(n) is an immediate data transfer instruction and, therefore, that IB2(n) is immediate data. The control circuit 6G controls to sends IB2(n) as immediate data to the execution circuit 5D via the bypass 7B.

(t7) The decoding result DB(n) of the immediate data transfer instruction is executed without meaning by the execution circuit 5D. The memory access that corresponds to DA(n) is executed without meaning by the control circuit 6G. IA2(n+1) is held in the instruction decoder 4 and is decoded. PB=n+1.

(t8) IB1(n+1) is held in the instruction register 3B. PBN=n+2.

(t9) DA(n+1) is executed by the execution circuit 5D. The memory access that corresponds to DA(n) is executed without meaning by the control circuit 6G. IB2(n+1) is held in the instruction decoder 4 and decoded. PA=n+2.

The data transfer of a double length immediate data to a register is executed in the WB stage corresponding to DA(n).

As has been explained so far, since the double length immediate data transfer instruction that includes immediate data is executed without interruption in one cycle, a delay in processing is prevented.

Ninth Embodiment

Figure 22:
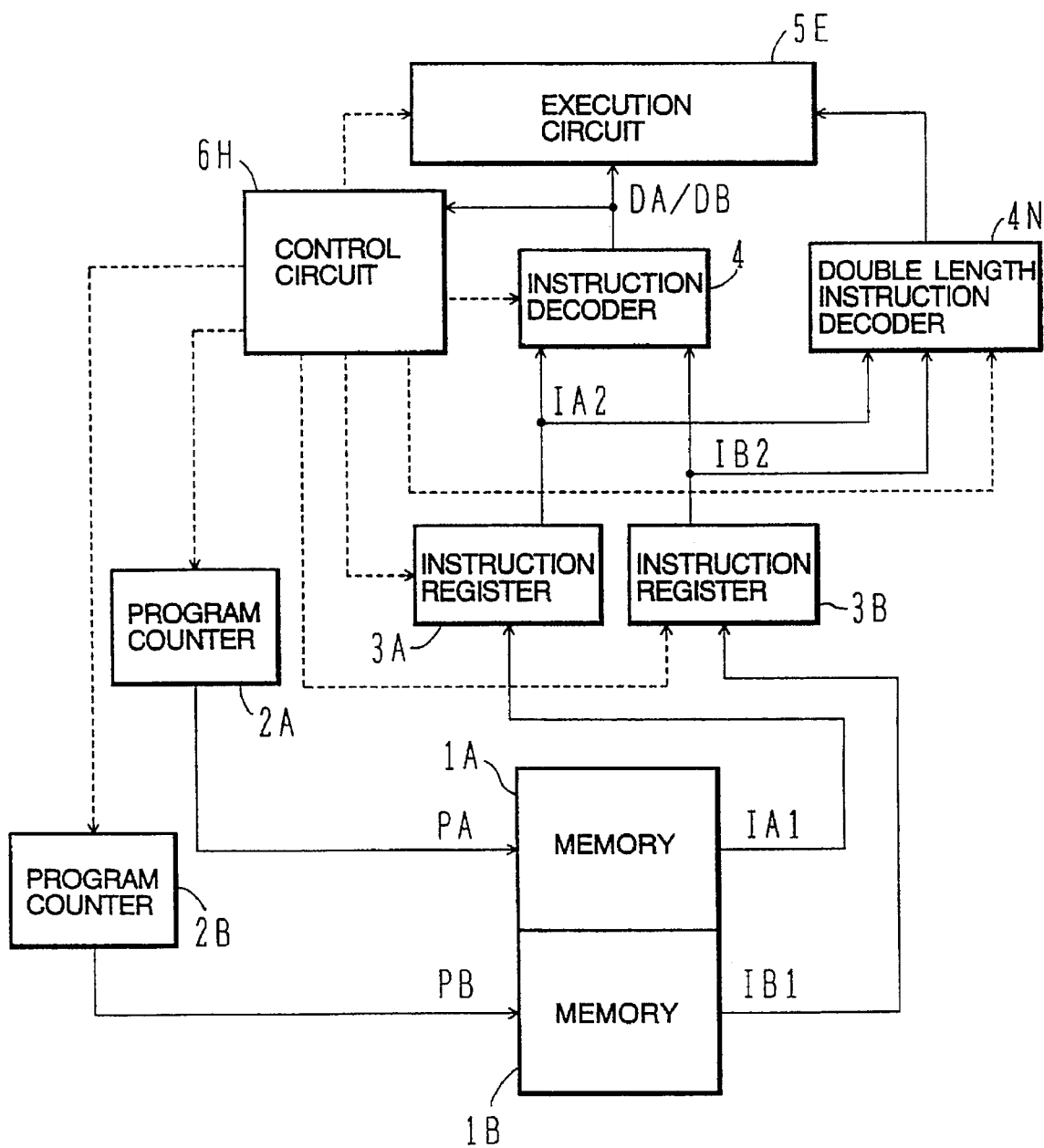
FIG. 22 is a block diagram showing a processor in the ninth embodiment according to the present invention.

FIG. 22 shows the processor in the ninth embodiment according to the present invention.

This processor is a simplified version of the structure shown in FIG. 7, having incorporated a similar simplification to that shown in FIG. 18. Namely, in order to execute a double length instruction faster, a double length instruction decoder 4N is added to the structure shown in FIG. 18 in addition to the instruction decoder 4, and the output terminals of the instruction registers 3A and 3B are connected to the input terminals of the double length instruction decoder 4N via the wires 8A and 8B respectively and the output terminal of the double length instruction decoder 4N is connected to the input terminal of the execution circuit 5E.

Since the operation performed by the control circuit 6H of this processor can be easily understood from the earlier explanation, its explanation is omitted here. With this processor too, the advantage described earlier, that a double length instruction can be executed without interruption in one cycle is achieved.

Although the present invention has been described in its preferred embodiments, it is to be understood that the invention is not limited thereto and that various changes and modifications may be made without departing from the spirit and scope of the invention.

What is claimed is:

1. A processor comprising for each i that is 1 to n, n being an integer greater than or equal to 2:

an i-th program counter;

i-th memory means for being addressed with an output from said i-th program counter;

an i-th instruction register for holding an output from said i-th memory means; and an i-th instruction decoder for fetching and decoding an output from said i-th instruction register;

said processor further comprising:

an execution circuit for selecting one of the outputs from said 1-st to n-th instruction decoders and for executing processing based upon the selected output; and a control circuit for inducing said execution circuit to select and execute said outputs from said 1-st to n-th instruction decoders sequentially, for inducing said i-th instruction decoder to fetch the output from said i-th instruction register after said execution circuit selects the output of said i-th instruction decoder, for inducing said i-th program counter to update after said i-th instruction decoder fetches, and for inducing said i-th instruction register to hold said output from said i-th memory means after said update;

wherein a program is stored in said 1-st to n-th memory means in units of one word in the order of said 1-st memory means to n-th memory means.

2. A processor according to claim 1 wherein:

the outputs of said 1-st to n-th instruction registers are supplied to the input terminals of said execution circuit via bypasses; and said control circuit decides whether or not the instruction is an immediate data transfer instruction based upon the output of said decoder and, if it is determined to be the immediate data transfer instruction, induces said execution circuit to fetch an immediate data through said bypass in order to execute the immediate data transfer instruction at once.

3. A processor according to claim 1, further comprising:

an N multiple length instruction decoder, where $2 \leq N \leq n$, for decoding successive N words in the outputs of said 1-st to n-th instruction registers and for supplying the decoding result to said execution circuit;

wherein said control circuit, when the output of said instruction decoder which is single length indicates an N multiple length instruction, induces said N multiple length instruction decoder to decode said N multiple length instruction, and induces said single-length instruction decoder to decode a following instruction after said N multiple length instruction.

4. A processor comprising:

a program counter;

memory means for storing n words of the program sequentially within one address and for being addressed with an output of said program counter to output said n words, n being an integer greater than or equal to 2;

1-st to n-th instruction registers for holding the output from said memory means, one word each for a total of n words;

1-st to n-th instruction decoders for fetching and decoding the outputs from said 1-st to n-th instruction registers respectively;

an execution circuit for selecting one of the outputs from said 1-st to n-th instruction decoders and for executing processing based upon the selected output; and a control circuit for inducing said execution circuit to select and execute the outputs from said 1-st to n-th instruction decoders sequentially, for inducing said i-th instruction decoder to fetch the output from said i-th instruction register after said execution circuit selects the output of said i-th instruction decoder, for inducing said program counter to update after said execution circuit selects all the outputs of said 1-st to n-th instruction decoders once, and for inducing said 1-st to n-th instruction registers to hold the output from said memory means after said update.

5. A processor according to claim 4 wherein:

the outputs of said i-st to n-th instruction registers are supplied to the input terminals of said execution circuit via bypasses; and said control circuit decides whether or not the instruction is an immediate data transfer instruction based upon the output of said decoder and, if it is determined to be the immediate data transfer instruction, induces said execution circuit to fetch an immediate data through said bypass in order to execute the immediate data transfer instruction at once.

6. A processor according to claim 4, further comprising:

an N multiple length instruction decoder, where $2 \leq N \leq n$, for decoding successive N words in the outputs of said 1-st to n-th instruction registers and for supplying the decoding result to said execution circuit;

wherein said control circuit, when the output of said instruction decoder which is single length indicates an N multiple length instruction, induces said N multiple length instruction decoder to decode said N multiple length instruction, and induces said single-length instruction decoder to decode a following instruction after said N multiple length instruction.

7. A processor comprising for each i that is 1 to n, n being an integer greater than or equal to 2:

an i-th program counter;

i-th memory means for being addressed with the output from said i-th program counter; and an i-th instruction register for holding the outputs from said i-th memory means;

said processor further comprising:

an instruction decoder for selecting one of the outputs from said 1-st to n-th instruction registers and for decoding the selected output;

an execution circuit for executing processing based upon the output from said instruction decoder; and a control circuit for inducing said instruction decoder to select the outputs from said 1-st to n-th instruction registers sequentially, for inducing said i-th program center to update after the output of said i-th instruction register is selected by said instruction decoder, and for inducing said i-th instruction register to hold the outputs of said i-th memory means after said update;

wherein a program is stored in said 1-st to n-th memory means in units of one word in the order of said 1-st memory means to said n-th memory means.

8. A processor according to claim 7 wherein:

the outputs of said 1-st to n-th instruction registers are supplied to the input terminals of said execution circuit via bypasses; and said control circuit decides whether or not the instruction is an immediate data transfer instruction based upon the output of said decoder and, if it is determined to be the immediate data transfer instruction, induces said execution circuit to fetch an immediate data through said bypass in order to execute the immediate data transfer instruction at once.

9. A processor according to claim 7, further comprising:

an N multiple length instruction decoder, where $2 \leq N \leq n$, for decoding successive N words in the outputs of said 1-st to n-th instruction registers and for supplying the decoding result to said execution circuit;

wherein said control circuit, when the output of said instruction decoder which is single length indicates an N multiple length instruction, induces said N multiple length instruction decoder to decode said N multiple length instruction, and induces said single-length instruction decoder to decode a following instruction after said N multiple length instruction.

* * * * *